United States Patent [19]

Bauer

[11] E Patent Number: Re. 33,448

[45] Reissued Date of Patent: Nov. 20, 1990

[54] FLUIDIC OSCILLATOR AND SPRAY-FORMING OUTPUT CHAMBER

[76] Inventor: Peter Bauer, 13921 Esworthy Rd., Germantown, Md. 20767

[21] Appl. No.: 227,227

[22] Filed: Jan. 22, 1981

Related U.S. Patent Documents

Reissue of:

[64] Patent No.: 4,184,636
Issued: Jan. 22, 1980
Appl. No.: 859,145
Filed: Dec. 9, 1977

[51] Int. Cl.[5] ..... B05B 1/08; F15B 21/12; F15C 1/08; F15C 1/22

[52] U.S. Cl. ..... 239/11; 73/861.19; 137/816; 137/822; 137/833; 239/589.1; 239/590

[58] Field of Search ..... 239/101, 102, 552–553.5, 239/589–590.5, DIG. 3, 1, 11, 589.1; 73/194 C, 194 US, 194 B, DIG. 8, 861.19; 137/803, 806–818, 822–826, 833, 834, 839, 841, 842

[56] References Cited

U.S. PATENT DOCUMENTS

| | | | |
|---|---|---|---|
| 3,185,166 | 5/1965 | Horton et al. . | |
| 3,209,774 | 10/1965 | Manion | 137/811 |
| 3,216,439 | 11/1965 | Manion | 137/810 |
| 3,258,024 | 6/1966 | Bauer | 137/811 |
| 3,434,487 | 3/1969 | Bauer . | |
| 3,587,603 | 6/1971 | Bailey | 137/809 |
| 3,589,185 | 6/1971 | Burgess | 73/194 B |
| 3,613,452 | 10/1971 | Zoerb . | |
| 3,640,133 | 2/1972 | Adams . | |
| 3,707,979 | 1/1973 | Zoerb . | |
| 3,973,558 | 8/1976 | Stouffer et al. . | |
| 4,052,002 | 10/1977 | Stouffer et al. | 239/102 X |
| 4,151,955 | 5/1979 | Stouffer | 239/11 |
| 4,244,230 | 1/1981 | Bauer | 73/861.19 |

FOREIGN PATENT DOCUMENTS

| | | | |
|---|---|---|---|
| 1330643 | 9/1973 | United Kingdom | 137/809 |

*Primary Examiner*—Andres Kashnikow
*Attorney, Agent, or Firm*—Griffin, Branigan & Butler

[57] ABSTRACT

A fluidic oscillator includes a chamber having a common inflow and outflow opening into which a jet is issued in a generally radial direction. After impinging upon the far chamber wall the jet is redirected to form a vortex on each side of the incoming jet. The vortices alternate in strength and position to direct outflow through the common opening along one side and then the other of the inflowing jet. A spray-forming output chamber is arranged to receive the pulsating outflows from the aforementioned or other fluid oscillator and establish an output vortex which is thereby alternately spun in opposite directions. An outlet opening from the output chamber issues fluid in a sweeping spray pattern determined by the vectorial sum of a first vector, tangential to the output vortex and a function of the spin velocity, and a second vector, directed radially from the vortex and determined by the static pressure in the chamber. By increasing or decreasing the static pressure, or by increasing or decreasing the vortex spin velocity, the angle subtended by the sweeping spray can be controlled over an unusually large range. By properly configuring the oscillator and/or output chamber, concentrations and distribution of fluid in the spray pattern can be readily controlled.

61 Claims, 9 Drawing Sheets

FIG.1
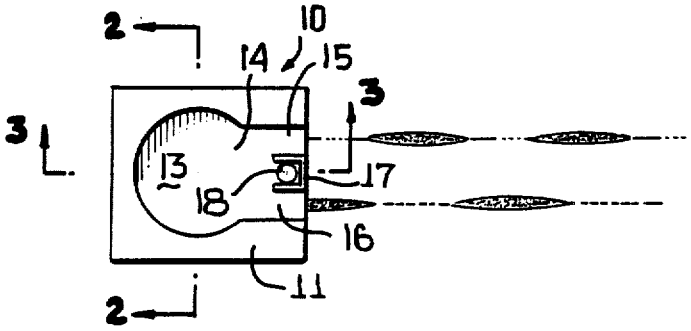
FIG.2
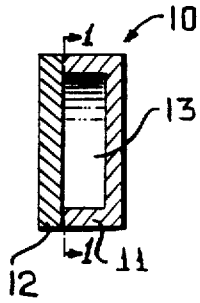
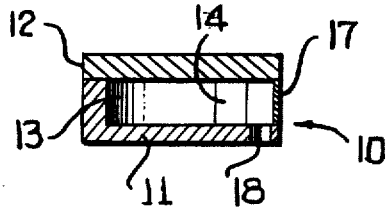
FIG.3
FIG.4
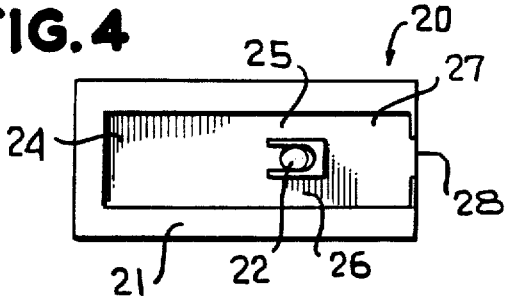
FIG.6
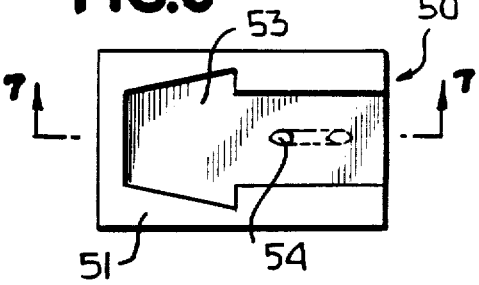
FIG.5
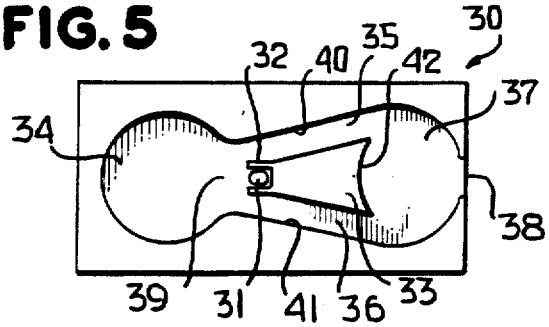
FIG.7
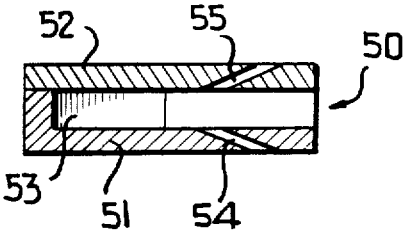
FIG.8
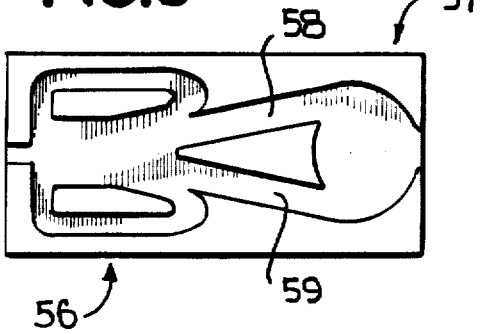
FIG.9
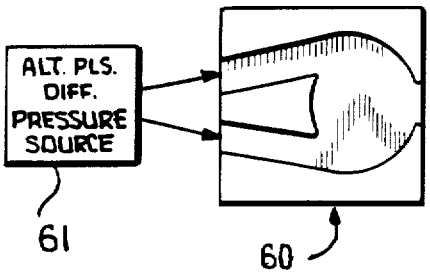

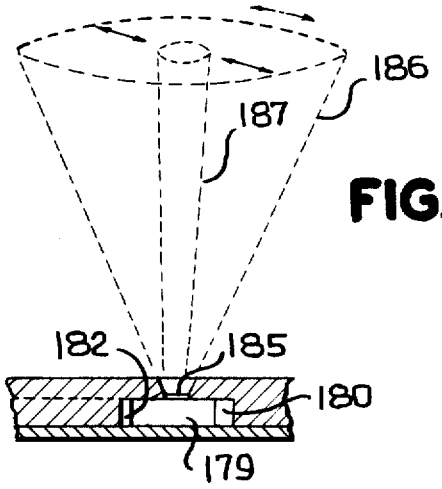
FIG.39
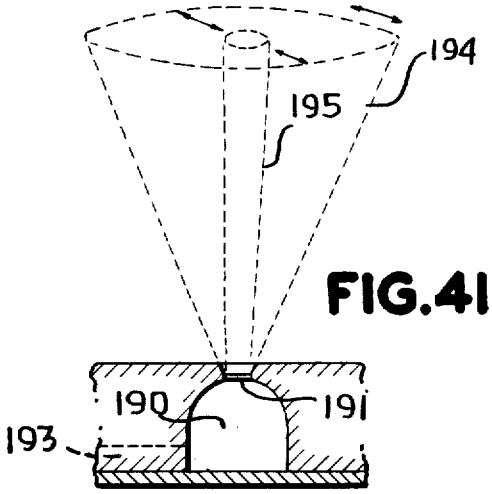
FIG.41
FIG.38
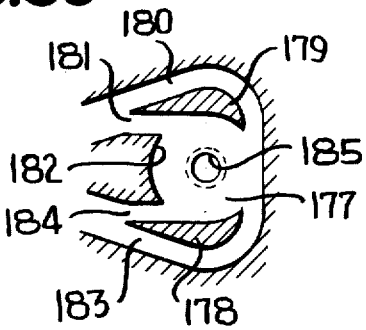
FIG.40
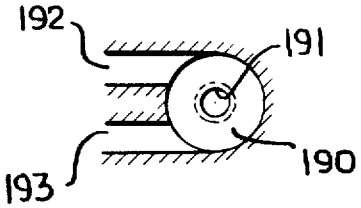
FIG.42
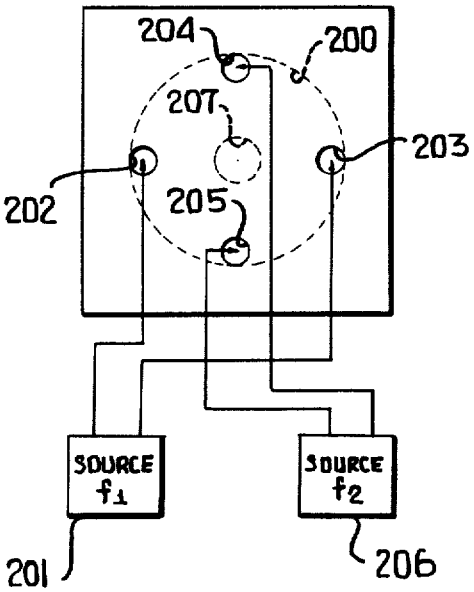
FIG.43
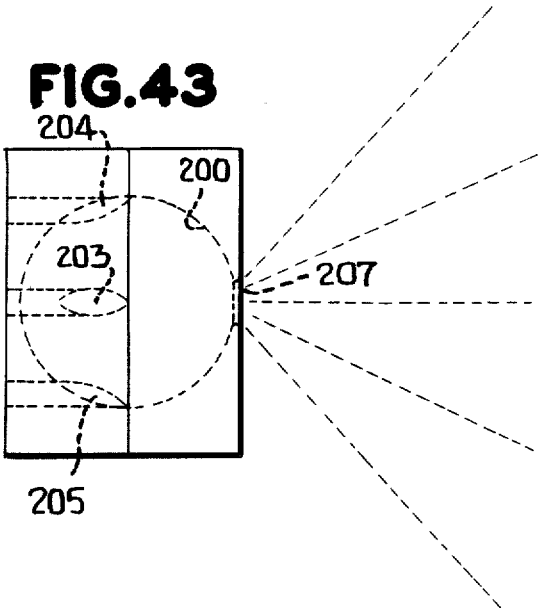

FLUIDIC OSCILLATOR AND SPRAY-FORMING OUTPUT CHAMBER

Matter enclosed in heavy brackets [ ] appears in the original patent but forms no part of this reissue specification; matter printed in italics indicates the additions made by reissue.

BACKGROUND OF THE INVENTION

The present invention relates to improvements in fluidic oscillators and to a novel spray-forming output chamber for fluidic oscillators.

It has been recognized in the prior art that fluidic oscillators can serve not only as fluidic circuit components but also as fluid distribution or spray devices. (See U.S. Pat. Nos. 3,432,102; 3,507,275; 4,052,002). In all of these patents a fluid jet is caused to oscillate by means of fluid interaction using no moving parts, and the resulting oscillating jet is issued into the ambient environment to disburse the fluid therein. Other fluidic oscillators, such as described in U.S. Pat. No. 3,563,462, issue discrete pulses of fluid in alternation from two or more spray openings. In most applications for prior art fluidic oscillators it has been found that oscillator performance is dramatically affected by relatively small dimensional variations in the oscillator passages and chamber. It has also been found that prior art oscillators are extremely sensitive to properties of the sprayed fluid, such as viscosity, surface tension, temperature, etc.

Another concern with prior art oscillators, particularly when employed to achieve specific spray patterns, is that the desired spray patterns are not achieved immediately upon start up. Generally, the desired spray pattern is achieved only after the oscillator is substantially filled with the spray fluid; however, until the oscillator is filled it is quite common for a non-oscillating jet to issue from the device.

Prior art fluidic devices have been designed to operate in accordance with well established fluidic principles, such as Coanda effect, stream momentum exchange effects, and static pressure control effects. It is, in my opinion, this reliance upon these standard fluidic effects which brings about the aforementioned limitations and disadvantages.

It is an object of the present invention to provide a fluidic oscillator which operates on a different principle than previous fluidic oscillators and, thereby, is not shackled with the aforementioned disadvantages.

It is another object of the present invention to provide a fluidic oscillator which is relatively insensitive to dimensional manufacturing tolerances.

It is yet another object of the present invention to provide a fluidic oscillator having improved operating characteristics over large ranges of variations of operating fluid properties and thereby offer wider application capabilities than prior art fluidic oscillators.

An important aspect of fluidic oscillators, when utilized as spray or fluid dispersal devices, is the waveshape of the issued spray or dispersal pattern. Depending upon the desired distribution characteristics, the waveshape must be tailored accordingly. For example, as described in the aforementioned U.S. Pat. No. 4,052,002, relatively uniform spatial distribution of the fluid is achieved if the waveform is triangular with little or no dwell time at the extremes of the fan-shaped sweep. As more dwell time is introduced in the extremes of the sweep, spatial distribution becomes more dense at the extremes and less dense at the center. To achieve higher densities at the center, or between the center and extremes of the sweep is difficult. Moreover, to tailor the sweep pattern to achieve many desired spatial distributions is difficult in the prior art oscillators.

Further, droplet size, in the case of liquids sprayed from prior art fluidic oscillators, is an important consideration in two respects. First, specific droplet sizes are required for different spray applications. Second, certain droplet sizes have been found to be dangerous to inhale and must be avoided. In prior art fluidic oscillators, the size of the oscillator pretty much determines the range of droplet sizes in the issued spray pattern. Often it occurs that a particular oscillator size is necessary to achieve the desired droplet size, but that such oscillator size is impractical for that application because of space requirements.

Still another important characteristic of spray and dispersal patterns from fluidic oscillators is the sweep frequency. Again, this characteristic is determined by the oscillator size in prior art fluidic oscillators. An example of one frequency requirement would be in a massaging shower wherein the frequency should be such as to provide a massaging effect, or in an oral irrigator wherein a massaging effect is likewise desirable. On the other hand, when the oscillator is used as a nozzle for hair spray or anti-perspirant it is desirable that no massaging effect be felt. As described in the case of droplet sizes above, it often occurs that an oscillator size which is suitable for achieving the desired sweep frequency is not satisfactory for the space requirement of the overall device.

It is therefore an object of the present invention to provide an improvement for fluidic oscillators which permits control over the spray pattern, droplet distribution, droplet size and sweep frequency of issued fluid.

It is another object of the present invention to provide an output region, useful with any fluidic oscillator, which permits considerable variation in the spray pattern and characteristics of oscillators of specified sizes.

It is still another object of the present invention to provide an output region for a fluidic oscillator which employs an entirely novel principle of spray formation and thereby permits control of the angle, frequency, droplet size and distribution of the issued spray pattern.

SUMMARY OF THE INVENTION

In accordance with the present invention a fluidic oscillator includes a chamber having a common inlet and outlet opening through which a fluid jet is issued across the chamber. Upon impacting the far wall of the chamber the jet forms two oppositely rotating vortices, one on either side of the jet, which alternate in strength and position in opposite phases in the chamber. Each vortex alternately conducts more or less fluid out of the common opening on its side of the jet. The alternating outflows may be issued as fluid pulses for a specific utilization or may be used in conjunction with the output chamber described below to achieve a desired spray pattern. Still another utilization of the oscillator is as a flow meter whereby the oscillator is disposed in a flow path and its oscillation frequency is measured to provide a linear function of flow. This configuration has been found to be relatively insensitive to dimensional manufacturing tolerance variations, and operates over a wide range of fluid characteristics.

In accordance with another aspect of the present invention an output chamber for a fluidic oscillator receives fluid pulses in alternating opposed rotational directions. An output vortex is established in the output chamber and is alternately spun in opposite directions by the alternating input pulses. One or more outlet openings at the periphery of the output chamber issue a sweeping spray that is determined by the vectorial sum of two flow components: a first component is directed tangential to the output vortex and has a magnitude proportional to the instantaneous flow velocity at the output vortex periphery; a second component is directed generally radially outward from the output vortex and is a function of the static pressure at the vortex periphery and the net flow rate into the output chamber. By reducing the static pressure in the chamber, for example by making the outlet opening wider or reducing the inflow, the frequency, droplet size and spray angle can be selected accordingly. By contouring the chamber walls, the fluid distribution with the spray pattern can be selected.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 1 is top view in section, taken along lines 1—1 of FIG. 2, showing the bottom plate of a fluidic oscillator constructed in accordance with the present invention;

FIG. 2 is an end view in section taken along lines 2—2 of FIG. 1;

FIG. 3 is a side view in section taken along lines 3—3 of FIG. 1;

FIG. 4 is a top view in plan of the bottom plate of another fluidic oscillator of the present invention combined with an input chamber according to the present invention;

FIG. 5 is a top view in plan of the bottom plate of another fluidic oscillator/output chamber combination of the present invention;

FIG. 6 is a top view in plan of the bottom plate of another fluidic oscillator according to the present invention;

FIG. 7 is a side view in section taken along lines 7—7 of FIG. 6;

FIG. 8 is a top view in plan of the bottom plate of a conventional fluidic oscillator combined with the output chamber of the present invention;

FIG. 9 is a top view in plan of the bottom plate of an output chamber of the present invention combined with schematically represented source of alternating fluid pulses;

FIGS. 38 and 39 are diagrammatic top plan and side section views, respectively, of another output chamber configuration according to the present invention;

FIGS. 40 and 41 are diagrammatic top plan and side section views, respectively, of another output chamber configuration according to the present invention;

FIGS. 42 and 43 are diagrammatic end and side views, respectively, of still another output chamber configuration according to the present invention;

DESCRIPTION OF THE PREFERRED EMBODIMENTS

Figure 10:
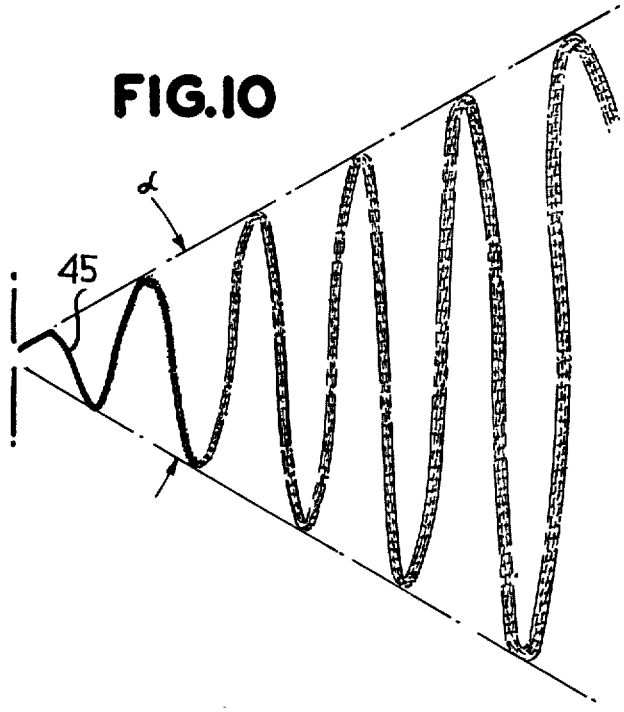
FIG. 10 is a diagrammatic representation of a typical waveform of a spray pattern issued from an output chamber of the present invention.

Referring specifically to FIGS. 1, 2 and 3 of the accompanying drawings, a basic oscillator 10 is shown as a plurality of channels, cavities, etc., defined as recesses in a bottom plate 11, the recesses therein being sealed by cover plate 12. It is to be understood that the channels and cavities formed as recesses in plate 11 need not necessarily be two-dimensional but may be of different depths at different locations, with stepped or gradual changes of depth from one location to another. For ease in reference, however, entirely planar elements are shown herein. It is also to be understood that whereas a two-plate (i.e. plates 11 and 12) structure is illustrated in each of the embodiments, this is intended only to show one possible means of construction for the oscillator and output chamber of the present invention. The invention itself resides in the various passages, chambers, cavities, etc. regardless of the type of structure in which they are formed. The oscillator 10 as formed by recesses in plate 11 and sealed by plate 12 includes an oscillation chamber 13 which in this embodiment is generally circular, having an opening 14 along one side which, for example, may subtend an angle of approximately 90° on the circle. A passage extending to the end of plate 11 from opening 14 is divided into two outlet passages 15 and 16 by a generally U-shaped member disposed therein. The U-shaped member has its open end facing chamber 13 and may be defined by means of recesses about member 17 in plate 11 or as a projection from cover plate 12 which abuts the bottom wall of the recess in plate 11. An inlet opening 18 is defined through the bottom of plate 11 within the confines of U-shaped member 17 and serves as a supply inlet for pressurized fluid. Opening 14 for chamber 13 serves as a common inlet and outlet opening for fluid in a manner described below.

Figure 11:
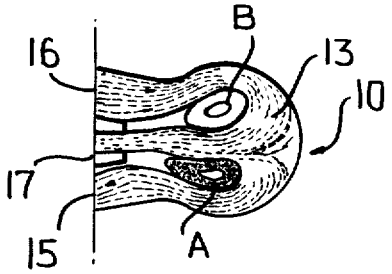
FIGS. 11, 12, 13, 14 and 15 are diagrammatic illustrations showing successive states of flow within a typical fluidic oscillator of the present invention.
Figure 12:
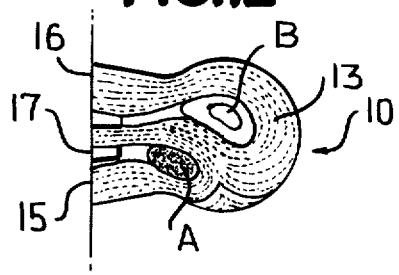
Figure 13:
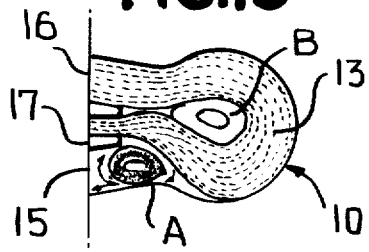
Figure 14:
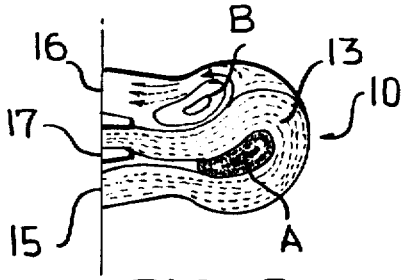
Figure 15:
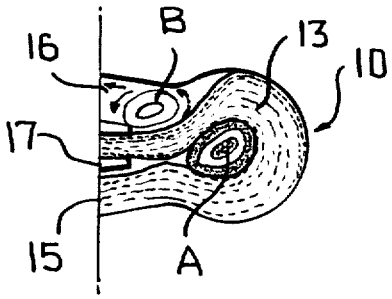

Operation of oscillator 10 is best illustrated in FIGS. 11 through 15. For purposes of the description herein it is assumed that the working fluid is a liquid and that the liquid is being issued into an air ambient environment; however, it is to be noted that the oscillator of the present invention and the output chamber of the present invention both operate with gaseous working fluids in gaseous environments, with liquid working fluids in liquid environments, and with suspended solid working fluids in gaseous environments. Upon receiving pressurized fluid through inlet opening 18, member 17 directs a jet of the fluid through opening 14 into chamber 13. Upon impinging against the far wall of chamber 13, the jet divides into two oppositely directed flows which follow the contour of chamber 13 and egress through output passages 15 and 16 on opposite sides of the input jet and member 17. These two reversing flows form vortices A and B on opposite sides of the inflowing jet. This condition, which is illustrated in FIG. 11, is highly unstable due to the mutual influences of the flow patterns on one another. Assume, for example, that as illustrated in FIG. 12 the vortex B tends to predominate initially. Vortex B moves closer toward the center of chamber 13, directing more of the incoming fluid along its counter-clockwise flowing periphery and out of output passage 16. The weaker vortex A, in the meantime, tends to be crowded toward output passage 15 and directs less of the input fluid in a clockwise direction out through passage 15. Eventually, as illustrated in FIG. 13, vortex B is positioned substantially at the center of chamber 13 while vortex A substantially blocks outlet passage 15. It is this condition during which the maximum outflow through passage 16 occurs. As vortex A is forced closer and closer to output passage 15, two things occur: vortex A pinches off outflow through output passage 15 and it also moves substantially closer to the mouth of member 17. In this condition vortex A receives fluid flowing at a much higher velocity than the fluid received by vortex B. Therefore, as vortex A moves closer to output passage 15 it begins spinning faster, in fact much faster than vortex B. With output passage 15 blocked, vortex A begins moving back toward the center of chamber 13 and in so doing forces the slower spinning vortex B back away from the center. This tendency is increased by the fact that the jet itself is issued toward the center of the chamber 13 and, if left unaffected by other influences, would tend to flow toward that center. Now when the vortices approach the condition illustrated in FIG. 11, vortex A is dominant and continues toward the center of the chamber 13. As was the case with vortex A when vortex B dominated vortex B is eventually pushed to a position illustrated in FIG. 15 whereby it blocks outflow through output passage 16. During this condition vortex A is centered in chamber 13 and substantially all of the outflow proceeds through output passage 15. Vortex B is now in a position to receive the high velocity fluid from the inflowing jet so that vortex B begins spinning faster and faster, taking on a growing position of dominance between the two vortices. Thus vortex B moves closer toward the center of chamber 13 as illustrated in FIG. 14. More fluid begins to egress through output passage 16 and less through output passage 15 as vortex B moves closer toward the center, all the time pushing vortex A back away from the center of chamber 13. The cycle is complete when the two vortices achieve the positions illustrated in FIG. 11 once again with equal flow through output passages 15 and 16. The cycle then repeats in the manner described. Summarizing the afore-described operation, initial flow of the jet into chamber 13 produces a straight flow across the chamber which splits into two loops near the far chamber wall. Each splitoff and reversed loop flow tends to form a vortex which exerts a force on the jet. The resulting unstable balance between the two vortices on either side of the flow cannot sustain the momentary initial condition since any minute asymmetry, causing a corresponding increase in one of the reverse flow loops, causes a decrease in reverse flow and force on the opposite side of the jet. This in turn begins to deflect the jet toward the side with the weaker reverse flow loop, which further enhances the action of the phenomenon. In other words, a positive feedback effect is present and it causes the flow exiting from the chamber to veer toward one side of the chamber until a new balance of vortices is reached. It must be recognized that the occurring phenomena are inherently of a transient dynamic nature such that any flow conditions are of a quasi-steady state nature wherein none of the existing flow patterns represents a stable state; that is, the flow state in any location is dependent upon its prior history due to the fact that local flow states influence and are influenced by those flow states in other locations only after a delay in time. Even though the stronger of the two existing vortices might appear capable of sustaining the illustrated flow pattern at any point, the quasi-steady state effect of the outflow into one or more of the output channels causes the pattern in the chamber to become more symmetrical. This in turn causes a diminution of reverse flow and, simultaneously, causes an increase in the reverse flow on the opposite side. Both effects become effective after a respective time delay. This time delay is additionally increased due to the fact that the rotational energy in the motion of the two vortices must dissipate before flow reversal can be effected. Thus for a brief period of time outflow through one output passage remains essentially constant (although its velocity may increase as its flow area is constricted) before diminishing and consequently its influence on the adjacent counterflow is also sustained for a similar period of time. *This influence, as best illustrated in FIGS. 13 and 15, is a bending of the outflow and the jet toward one another as a result of their mutual aspiration and the relative strengths of vortices A and B. This bending proceeds downstream, as illustrated in FIG. 12, under the combined effects of the mutual aspiration and the increase in strength of vortex A while vortex B decreases in strength.* The flow pattern becomes more symmetrical and the buildup of the opposite reverse loop flow causes outflow to the opposite output channel. The vortex loop effects in large part comprise inertance and compliance phenomena with energy storage mechanisms, all of which are essential to the oscillation function.

The resulting output flow from the oscillator 10 is best illustrated in FIG. 1 as alternating slugs of fluid issue from passages 15 and 16. It should be noted that the cross section of chamber 13 illustrated in FIG. 2 need not be rectangular but may be elliptical, in the form of a meniscus, or any other varying depth configuration. Similarly the plan form of chamber 13 need not be circular as shown but may be substantially any configuration such as the rectangular configuration illustrated in FIG. 4. Specifically, element 20 in FIG. 4 is shown with only the bottom plate 21, the top plate being removed for purposes of simplification and clarity of description. In fact, for most of the oscillators shown and described hereinbelow, the top plate has been removed for these purposes. Oscillator 20 includes an inlet opening 22 similar to inlet opening 18 of FIG. 1 and a generally U-shaped member 23 similar to U-shaped member 17 in FIG. 1. Outlet passages 25 and 26 on either side of U-shaped member 23 correspond to outlet passages 15 and 16 of FIG. 1. An oscillation chamber 24 is generally rectangular in configuration with its width corresponding to the distance between the extremeties of passages 25 and 26. The output passages 25 and 26 are directed into an output chamber 27 which is a continuation of chamber 24 beyond U-shaped member 23 and has sidewalls which extend parallel all the way to outlet opening restriction 28. Oscillation of the jet issued from member 23 proceeds in the manner described in connection with FIGS. 11 through 15. The squared-off or rectangular shape of chamber 24 affects the shape of the output pulses but does not prevent oscillation from occurring. More specifically, the oscillation cycle in a chamber configured such as chamber 24 tends to have a greater dwell in the extreme positions where maximum flow through each output passage occurs. The resulting output slugs of fluid tend to have more discrete leading and trailing edges than the tapered leading and trailing edges shown in FIG. 1.

Output chamber 27 receives the alternating slugs of fluid in opposing rotational senses; that is, the flow from passage 25 tends to create a clockwise flow in chamber 27 whereas the flow through passage 26 tends to create a counter-clockwise flow in chamber 27. The result is the establishment of an output vortex in chamber 27, which vortex is alternately spun first in a clockwise and then in a counter-clockwise direction in response to the alternating inflows. The manner in which output chamber 27 provides a cyclically sweeping spray pattern is best described in relation to the embodiment of FIG. 5.

Figure 16:
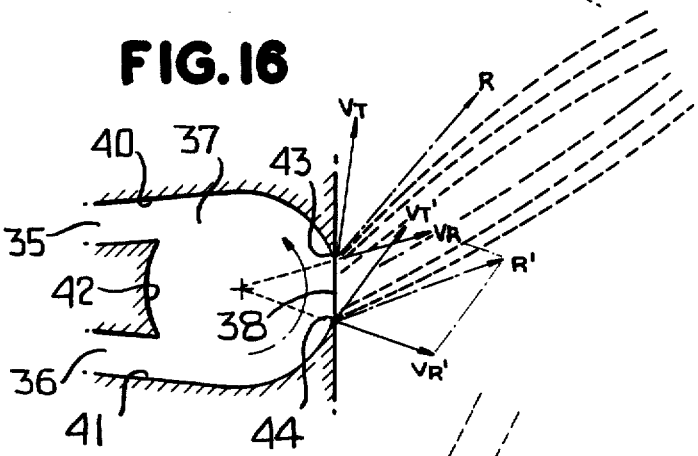
FIG. 16 is a diagrammatic illustration of the flow pattern associated with a typical single-outlet output chamber according to the present invention.

Referring specifically to FIG. 5, an oscillator/output chamber configuration 30 includes an input opening 31 for pressurized fluid which is directed into a generally circular chamber 34 by means of a generally U-shaped channel 32. U-shaped channel 32 is part of an overall flow divider section 33. Downstream of the common inlet and outlet opening 39 of oscillation chamber 34, the sidewalls 40 and 41 of the unit diverge such that sidewall 40 along with flow divider 33 forms outlet passage 35 from the oscillator, whereas sidewall 41 along with flow divider 33 forms outlet passage 36. The sidewalls 40 and 41 begin to converge toward outlet opening 38 in output chamber 37. The downstream surface 42 of flow divider 33 is concave so that a generally rounded output chamber 37 results. Passages 35 and 36 deliver fluid into output chamber 37 in opposite rotational senses. The manner in which the spray is issued from chamber 37 is diagrammatically illustrated in FIG. 16. Referring to FIG. 16, the input flows from passages 35 and 36 produce an output vortex which alternately rotates first in a clockwise direction and then in a counter-clockwise direction. At each point across outlet opening 38 there is a summation of flow velocity vectors which determines the overall shape of the issued spray pattern from this outlet opening. For ease in reference and simplification only two such points are illustrated in FIG. 16, namely, the extremities 43 and 44 of outlet opening 38. For the following discussion it is assumed that the vortical flow in chamber 37 is counter-clockwise as indicated by the arrow therein. At point 43 there is a tangential velocity $V_T$ directed tangentially to the output vortex at that point, and a radial velocity component $V_R$ directed radially from the output vortex at that point. The summation of vectors $V_T$ and $V_R$ is a resultant flow velocity R emanating from point 43. Tangential velocity vector $V_T$ results solely from the spin effect in the vortex and thereby results only from the dynamic pressure at point 43 produced by the output vortex. The radial velocity vector $V_R$ results from the static pressure and net flow into chamber 37 from passages 35 and 36. A similar analogy is presented for vectors $V'_T$ and $V'_R$ at point 44 on the other side of outlet opening 38. These vectors sum to provide a further resulting vector R'. Vectors R and R' define the extremities of the fluid issued from outlet opening 38 at a particular instant of time. At that instant of time the outflow from outlet 38 is confined between the vectors R and R'. These vectors diverge producing a tendency for the outflow to diverge; however, surface tension effects act in opposition to the divergence tendency to try to reconsolidate the stream. In most practical applications, particularly for high velocities, the issued flow tends to break up into droplets before too much consolidation is effected. Nevertheless, there is some reconsolidation so that there is no continuation in the divergence tendency. Important is the fact that flow issued from outlet opening 38 at any instant of time spreads in the plane of the output vortex. It is this spreading flow that is oscillated back and forth as the output vortex in chamber 37 continuously changes velocity and direction. An overall spray pattern of this type is illustrated in FIG. 10 wherein it is noted that the sheet 45 sweeps back and forth in an almost sinusoidal pattern and within a short distance, depending on the pressure, begins breaking up into ligaments and then droplets of fluid as the issued stream 45 viscously interacts with the surrounding air. This viscous interaction is the mechanism which causes a cyclically swept jet to break up into multiple droplets and form a spray pattern of a generally fan-shaped configuration. However in the case of the swept spreading flow pattern issued from outlet opening 38, the flow itself tends to break up into droplets much more readily than an integral jet at corresponding pressures. As a corollary, smaller droplet sizes can be achieved with the use of output chamber 37 than can normally be achieved with a conventional fluidic oscillator of a comparable size at the same operating pressure.

In the summary of the operation of chamber 37, it may be looked upon as serving as a restriction (analogous to an electrical resistance) and inertance (analogous to an electrical inductance) filter circuit to smooth out incoming pulsating signals and to combine the result in a suitable single output stream which remains substantially constant in amplitude but sweeps from side to side regularly as the vortex changes direction and speed. The static pressure in chamber 37 produces a radial velocity vector $V_R$ at each point of the outlet opening 38. The spin velocity of the vortex in chamber 37 produces a tangential velocity vector $V_T$. I have observed that the sweep angle $\alpha$ illustrated in FIG. 10 varies directly with the tangential velocity vector $V_T$ and inversely with the radial velocity vector $V_R$. When the spin velocity is exceedingly large and the static pressure is exceedingly small so that the tangential velocity vector $V_T$ dominates, I have observed fan or sweep angles $\alpha$ as large as 180 degrees. On the other hand when the static pressure dominates over the spin velocity so that the radial velocity vector $V_R$ is relatively large, a minimal or hardly noticeable sweep angle $\alpha$ is produced. Thus by increasing the width of outlet opening 38, and thereby decreasing the static pressure in chamber 37, I have been able to achieve a significant increase in the fan angle $\alpha$. Likewise, by shaping the contour of walls 40, 41 proximate outlet 38, such as by narrowing the region therebetween, I have been able to considerably reduce the fan angle $\alpha$. These and other effects are illustrated in association with other embodiments described hereinbelow.

Refer now to FIGS. 6 and 7 of the accompanying drawings. There is illustrated another form of the oscillator of the present invention. Specifically, oscillator 50 includes a top plate 52 and a bottom plate 51. Recesses are defined in bottom plate 51 to form the oscillator, the recesses being covered by cover plate 52 to provide the necessary sealing. Oscillator 50 differs from oscillator 10 of FIG. 1 in two respects: first, the shape of the oscillation chamber 53 is generally trapezoidal rather than circular; and second, input fluid is delivered from supply passages 54 and 55 defined through bottom and top plates 51 and 52, respectively. Passages 54 and 55 are angled to direct the incoming fluid into chamber 53 as a common supply jet which oscillates in the same manner described in relation to the oscillator in FIG. 1. Passages 54 and 55 permit the U-shaped member 17 of FIG. 1 to be eliminated so that no structure is present in the plane of the oscillator. The trapezoidal chamber 53 and the rectangular chamber 24 of FIG. 4 are merely examples of the multitude of variations that can be utilized in the oscillator chamber configurations and still achieve the desired oscillation. For example, the oscillating chamber may be elliptical, irregularly shaped, polygonal, or whatever, so long as there is room for the alternating vortices to develop and move in the manner described in relation to FIGS. 11 through 15.

*As shown in the drawings, the chamber wall on which the jet impinges is devoid of discontinuities which protrude into the chamber. Such discontinuities would disturb the circulating flow pattern along the impingement wall as described in relation to FIGS. 12–15.*

Referring to FIG. 8 there is illustrated a fluidic oscillator 56 of a conventional type, well known in the prior art, having outlet passages 58 and 59 which deliver the alternating outflow from the oscillator to an output region 57 constructed in accordance with the present invention. Chamber 57 operates in the same way described above for chamber 37 irrespective of the nature of the oscillator which delivers the alternating slugs of fluid thereto. To further illustrate this point, there is illustrated in FIG. 9 an output chamber 60 which is fed by a schematically represented source of alternating pulses which may be any such source such as an alternating shuttle valve, a fluidic amplifier, etc.

Figure 17:
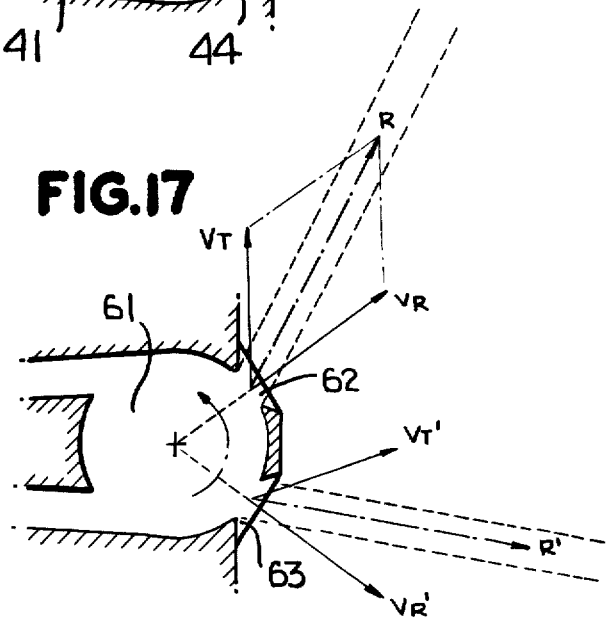
FIG. 17 is a diagrammatic illustration of the flow pattern associated with a typical plural-outlet output chamber according to the present invention.

Referring now to FIG. 17 of the accompanying drawings there is illustrated an output chamber 61 similar in all respects to output chamber 37 in FIG. 16 but which instead of having a single outlet opening 38 has two such outlet openings 62 and 63. The vector analysis applied to the embodiment of FIG. 16 applies equally as well to the diagrammatic embodiment of FIG. 17 where similar vectors are illustrated. From chamber 61, however, there are two outflows which issue, each being swept at the same frequency. However, the two resulting outputs diverge from one another at any instant of time by somewhat more than the angle subtended between the two vectors $V_R$ and $V'_R$. This is because the tangential vectors $V_T$ and $V'_T$ subtend a greater angle than exists between the radial vectors, as is the case in FIG. 16. As a consequence two synchronized (in frequency) sweeping sheets issue to form a composite waveshape of the type illustrated in FIG. 18.

It is to be noted, by means of further explanation of the operation of output chambers 37 and 61, that the radial vector $V_R$ increases somewhat in amplitude at the time when the spin reverses direction; $V_R$ decreases to a minimum value when the spin has its extreme maximum amplitude. Therefore, a phase shift exists between the maxima of the pulsating input signals to chambers 37 and 61 and the spin velocity maximum in the output vortex. It should also be noted that depending upon the particular design of the chamber the pressure at the center of the output vortex may fluctuate from below atmospheric pressure to above atmospheric pressure.

Figure 18:
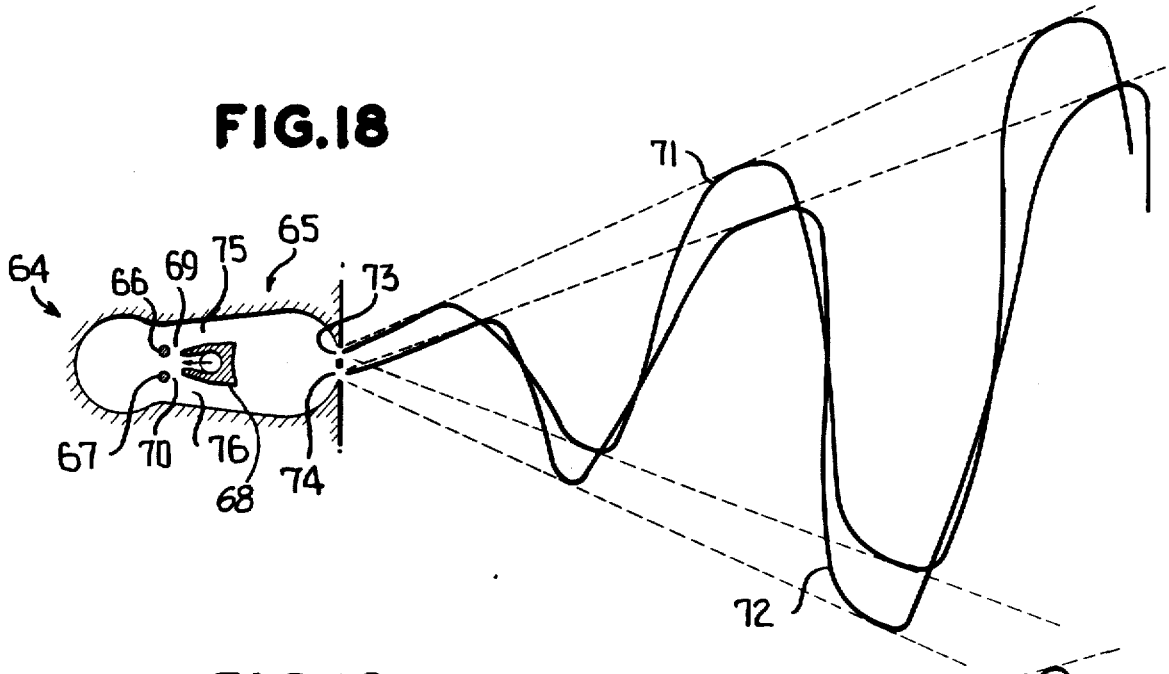
FIG. 18 is a diagrammatic representation of the waveforms of the output sprays issued from the output chamber of FIG. 17.

Referring to FIG. 18, an oscillator, of the general type illustrated in FIG. 1, is modified by incorporating two upstanding members 66, 67 on opposite sides of the jet issued from U-shaped member 68. Members 66 and 67 are shown as cylinders (i.e. circular cross-section) but their cross sections can take substantially any shape. Importantly, they are spaced slightly downstream from the ends of member 68 so that respective gaps 69 and 70 are defined between member 68 and members 66 and 67. The presence of members 66 and 67 and the resulting gaps has the effect of sharpening or "squaring off" the pulses issued from oscillator 64 as compared to the tapered pulses shown in FIG. 1. More specifically, in reference to the discussion above relating to FIGS. 11–15, the displaced vortex takes longer to build up when members 66 and 67 are present, partly because of the loss of energy in the input jet in traversing the region of gaps 69, 70. This loss of jet energy means that the energy feeding the displaced vortex is less so that vortex build up takes longer. However, when the displaced vortex does build up sufficiently to dislodge the centered vortex, it has grown to the point where the transition is rapid. Hence, there is a relatively long dwell time in the extreme positions (i.e. FIGS. 13 and 15) and a rapid transition between these positions; this results in sharp-edged pulses or slugs.

Output chamber 65 tends to filter these sharp edges somewhat in its action as an RL (i.e.—restriction and inertance) filter. This is shown in the spray output waveforms 71 and 72 issued from output openings 73 and 74, respectively, in chamber 65. In addition, if the passages 75 and 76 are lengthened, thereby adding inertance, additional filtering is achieved.

As described above in relation to FIG. 17, I have observed that the waveforms 71 and 72 issued from the two outlets of chamber 65 are synchronized in frequency and phase but are spread spatially by an angle which is greater than the angular spacing between outlet openings 73 and 74. This is because the tangential velocity vectors $V_T$ and $V'_T$ are displaced from one another by an angle which is greater than the spacing between the radial velocity vectors $V_R$ and $V'_R$.

Figure 19:
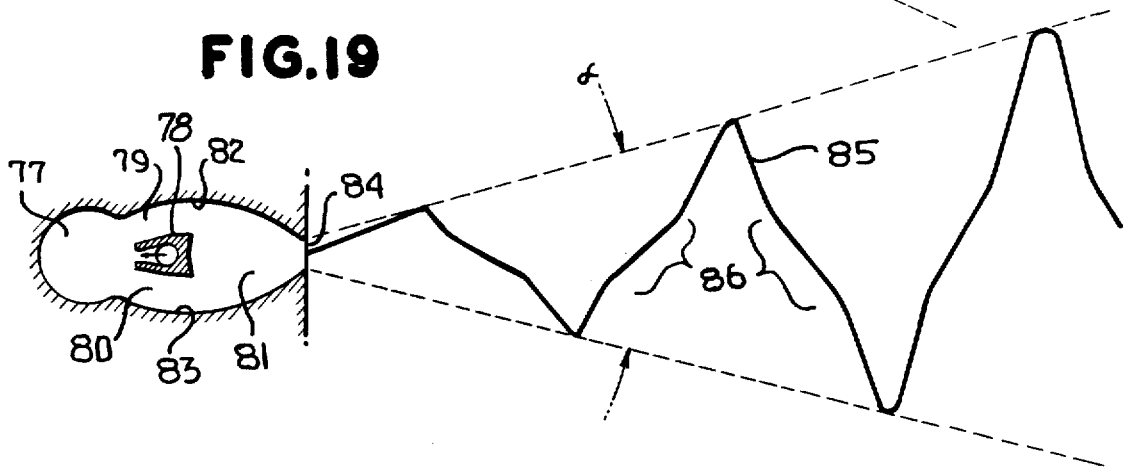
FIGS. 19 and 20 are top plan views of the bottom plate of respective oscillator/output chamber combinations of the present invention, illustrating diagrammatically the output waveforms associated therewith.
Figure 20:
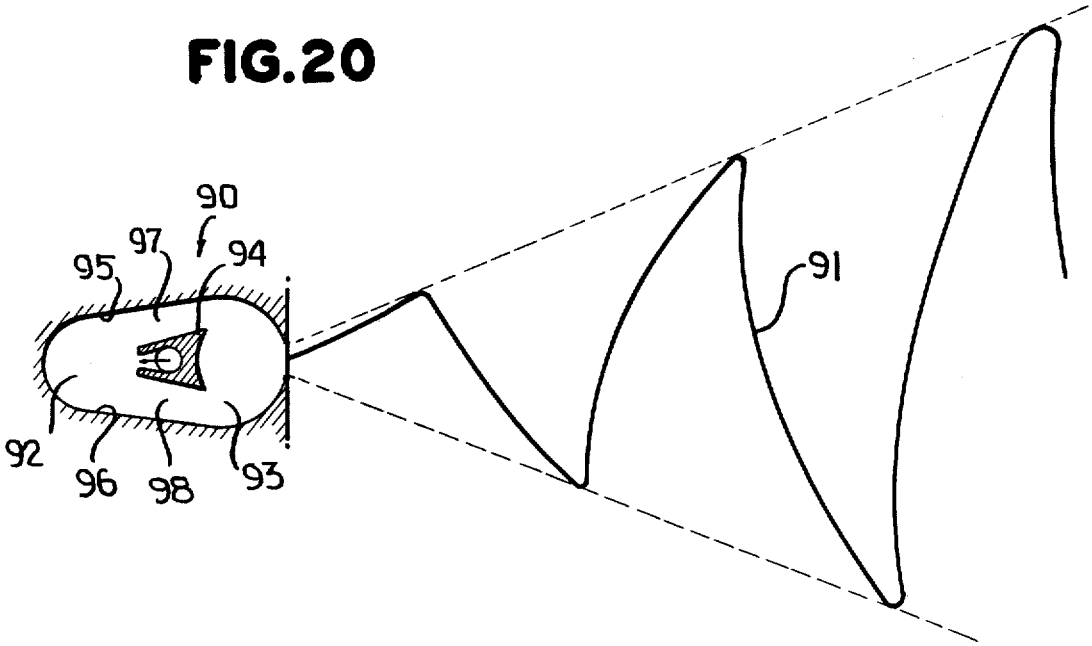

FIGS. 19 and 20 illustrate the manner in which the shape of the output chamber affects the sweep waveshape. In FIG. 19 a generally circular oscillation chamber receives a jet from U-shaped member 78 and oscillation ensues in the manner previously described. The alternating output pulses from the oscillator are conducted by passages 79 and 80 to output chamber 81 which is formed between converging sidewalls 82 and 83. The convergence of the sidewalls produces a relatively narrow output chamber 81. The single outlet opening 84 issues a sweeping spray pattern having the waveform diagrammatically represented as 85. It is noted that waveform 85 has a slower transition between sweep extremities (i.e. a longer dwell 86 in the center) than does sweep waveform 45 of FIG. 10. Also noted is the fact that the sweep angle $\alpha$ is somewhat smaller than in waveform 45. These effects result from the narrowed output chamber 81, primarily because the radial velocity component $V_R$ is larger when the output chamber is narrow. The larger velocity component is due to the fact that the static pressure in the narrowed chamber volume is greater, and $V_R$ is affected by the static pressure. Waveform 85 results in a spray pattern having a heavier concentration of fluid droplets or particles in the center than at the extremities of the sweeping flow.

In contrast oscillator/output chamber combination 90 of FIG. 20 produces a different waveform 91. Specifically, element 90 is in the general form of an oval which is wider at its outlet chamber end than at its oscillation chamber end. The oscillation chamber 92 receives a fluid jet from U-shaped member 94 and produces oscillation in much the same fashion described in relation to FIGS. 11 through 15. The common inlet and outlet opening for chamber 92, however, subtends more than 180° of the generally circular chamber 92. In other words, the sidewalls 95, 96 of the element 90 are straight diverging walls between the oscillation chamber 92 and output chamber 93. Member 94 is disposed between the sidewalls and forms therewith connecting passages 97, 98 between chambers 92 and 93. The radius of oscillation chamber 92 is substantially the same as in chamber 77 in FIG. 19. However, output chamber 93 is considerably wider than chamber 81. The resulting waveform 91 is seen to be considerably different than waveform 85 of FIG. 19. Specifically, waveform 91 is a generally triangular wave, with sawtooth tendencies, in which the central concentration 86 of FIG. 19 is not present. This absence of central concentration results from the widening of chamber 93 as compared to chamber 81. The transition region (i.e. between the extremes) of the sweep waveform 91 is much smoother and it is also noted that it exhibits a concave (as viewed from downstream) tendency. The concavity indicates that the fluid in the center of the pattern is moving slightly more slowly than the fluid at the sweep extremities. In general, waveform 91 provides very even distribution across the sweep path.

Figure 21:
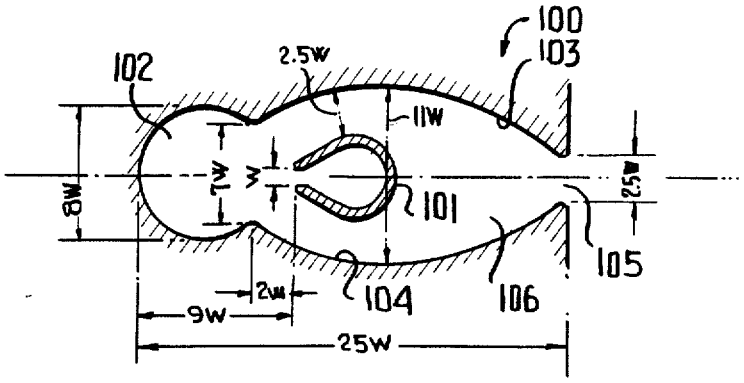
FIG. 21 is a top plan view of the bottom plate of a fluidic oscillator/output chamber combination according to the present invention, showing relative dimensions of the various elements of the combinations.

The oscillator/output chamber combination of the present invention has been found to provide the same pattern when scaled to different sizes. Thus, a small device for use as an oral irrigator may have a nozzle width at U-shaped member on the order of a few thousandths of an inch. This oscillator may be scaled upward in every dimension to provide, for example, a large decorative fountain and still produce the same, albeit larger, waveform. A scaled outline of an oscillator/output chamber combination 100, similar to the device in FIG. 19, is illustrated in FIG. 21. As can be seen, all dimensions are scaled to the width of the nozzle W formed at the outlet of the generally U-shaped member 101. The diameter of the oscillation chamber 102 is 8W. The distance between the nozzle and the far wall of chamber 102 is 9W. The common inlet and outlet opening for chamber 102 is 7W and is spaced 2W from the nozzle. The closest spacing between member 101 and the sidewalls 103, 104 is 2.5W, and the maximum spacing between the sidewalls is 11W. The length of the unit 100 is 25W and the width of outlet opening 105 from output chamber 106 is 2.5W. Device 100 can be constructed to substantially any scale and operates in accordance with the principle described herein. It is to be stressed, however, that the relative dimensions of device 100 are intended to achieve only one of multitudinous waveforms possible in accordance with the present invention and that these dimensions are not to be construed as limiting the scope of the invention.

Figure 22:
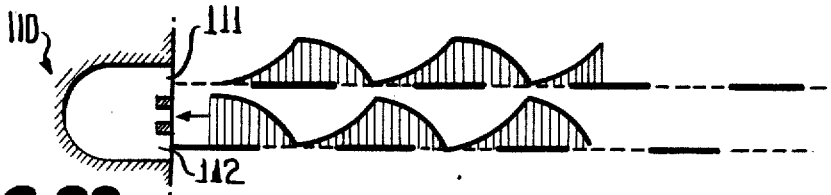
FIG. 22 is a diagrammatic illustration of the wave shape of alternating pulses issued from one oscillator embodiment of the present invention.
Figure 23:
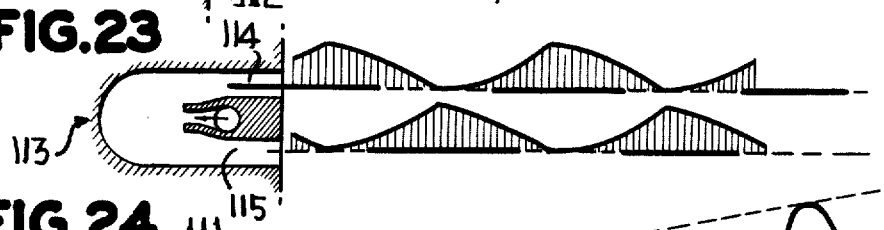
FIG. 23 is a diagrammatic illustration of the waveshape of alternating pulses issued from another oscillator embodiment of the present invention.
Figure 24:
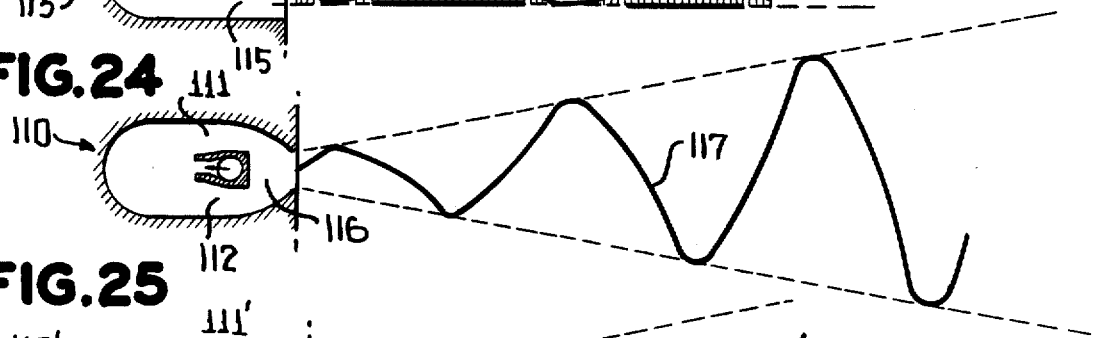
FIGS. 24, 25 and 26 are diagrammatic illustrations of the waveshapes of the spray patterns issued from three respective oscillator/output chamber combinations according to the present invention.
Figure 25:
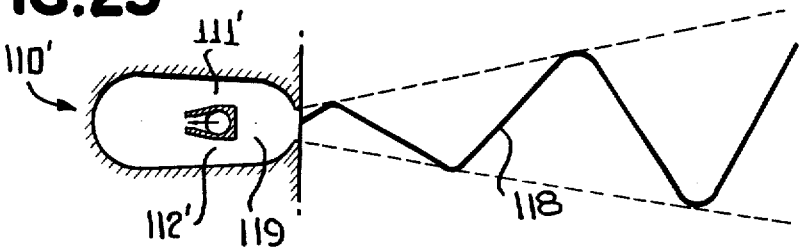
Figure 26:
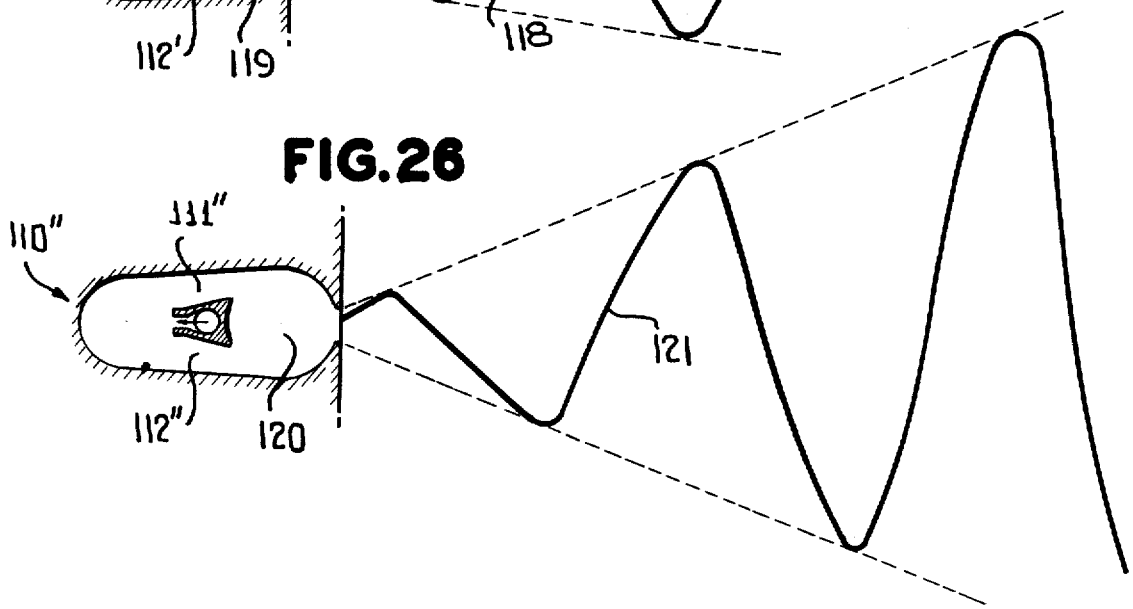

FIGS. 22 through 26 illustrate comparative waveforms attained when various dimensions of the oscillator/output chamber are changed. Specifically, oscillator 110 of FIG. 22 is shown with relatively short output passages 111, 112. The resulting issued pulses are shown with amplitude plotted against time. The output pulse trains consist of sawtooth waves which are 180° separated in phase. This may be compared to oscillator 113 with considerably longer outlet passages 114 and 115. Again sawtooth waveforms are produced, but the individual pulses are considerably smoothed and the frequency is considerably less. This is primarily due to the fact that the longer passages 114 and 115 introduce greater inertance (the analog of the electrical parameter inductance) in to the oscillator, making the response in the oscillation chamber considerably slower. In FIG. 24 the oscillator 110 (of FIG. 22) with short outlet passages 111 and 112 is combined with a relatively small volume output chamber 116. The waveform 117 of the sweeping spray issued from chamber 116 is a sawtooth waveform wherein the transition portions between sweep extremities bulges in a downstream direction. This signifies that the flow in the middle or transition portion of the sweep pattern is moving at a slightly greater velocity than at the extremes. This may be compared to waveform 91 of FIG. 20 wherein the bulge is in the opposite direction, signifying slower travelling fluid in the central portion of the sweep pattern. The reason for this is that in the smaller output chamber 116 there is less vortical inertance so that spin velocity tends to slow down more quickly after the impetus of a driving pulse from the oscillator subsides. The slow down permits the radial velocity $V_R$ to dominate and impart a high radial velocity to the issued fluid during the central part of the sweep. Oscillator 110' illustrated in FIG. 25 is essentially the same as oscillator 110 but is shown, in combination with a somewhat widened output chamber 119. Chamber 119 affords a greater vortical inertance, providing less of a tendency for the vortex to slow down when a driving pulse subsides. The result is a waveform 118 in which the downstream bulge is not present, primarily because the dominance of the radial velocity vector is no longer present. Increasing the output chamber size even further, as with chamber 120 of FIG. 26, produces a waveform 121 wherein the central portion tends to bulge slightly in an upstream direction or opposite that in waveform 117 of FIG. 24. This shows a tendency toward waveform 91 of FIG. 20 wherein the fluid at the center of the pattern begins to flow more slowly than the fluid at the extremes. This results from an increased vortical inertance in the larger chamber 120, which inertance produces a tendency for the vortex to continue spinning after the driving pulse subsides and thereby causes the tangential velocity vector $V_T$ to take on dominance. Further, the dominance of the tangential vector $V_T$ causes the sweep angle to increase as seen from the larger angle subtended by waveform 121 that by waveforms 117 and 118. In all three embodiments (FIGS. 24, 25 and 26) distribution of fluid within the sweep pattern is relatively even.

Figure 27:
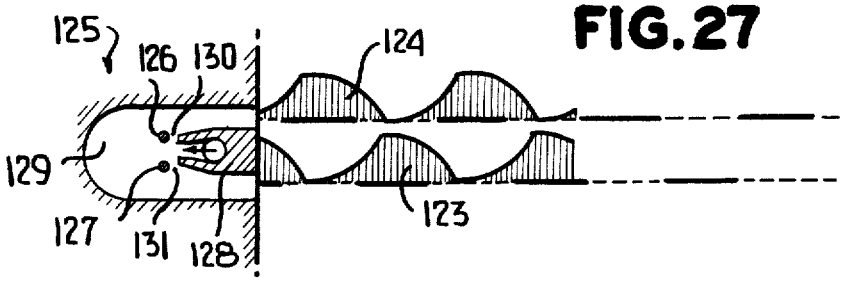
FIG. 27 is a diagrammatic representation of the alternating pulse waveshapes issued from still another oscillator embodiment of the present invention.
Figure 28:
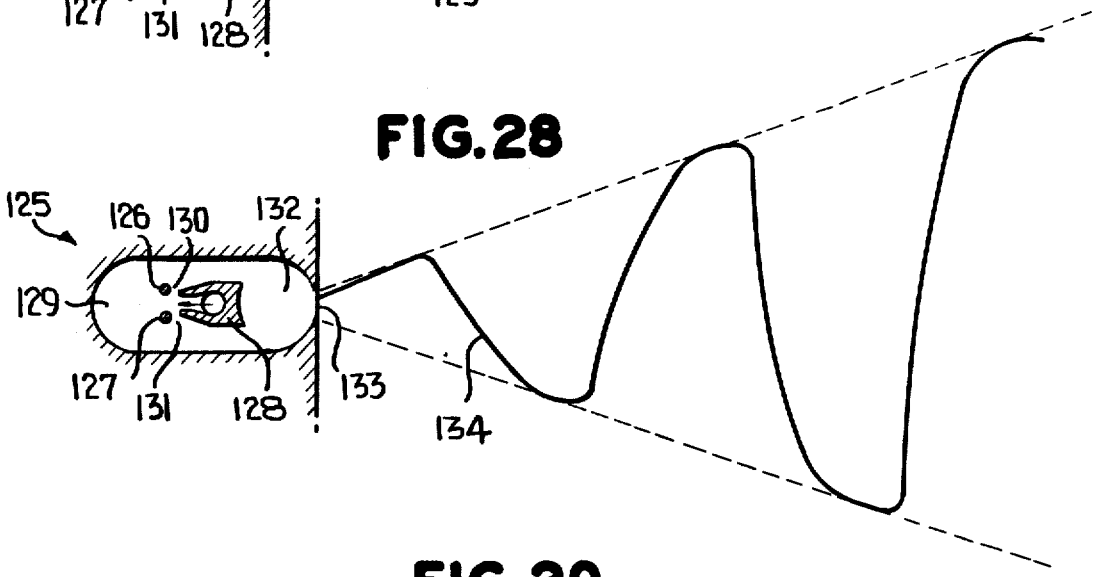
FIG. 28 is a diagrammatic representation of the waveshape of a spray pattern issued from a combination of the oscillator of FIG. 27 with an output chamber of the present invention.

Referring next to FIG. 27, an oscillator 125 is constructed in a manner similar to oscillator 64 of FIG. 18 in that members 126, 127 are spaced slightly from U-shaped member 128 to provide gaps 130, 131 which provide communication between the input jet and the output pulses. As described in relation to FIG. 18, this construction tends to square off or sharpen the pulses, producing greater dwell in the extreme portions of the oscillator cycle and a relatively fast switching or transition between extremes. This is manifested by the amplitude versus time slots of the output pulses 124 and 123, which show a flattened peak as compared to the somewhat sharper pulse peaks illustrated in FIGS. 22 and 23. Oscillator 125 is illustrated again in combination with output chamber 132 in FIG. 28. Outlet opening 123 from chamber 132 issues a spray pattern having the waveform 134 which has longer dwell times at the sweep extremities than the waveforms in FIGS. 24, 25 and 26. As described in relation to FIG. 18, the members 126, 127 tend to delay the re-strengthening of the displaced vortex (A in FIG. 13) so that there is greater dwell at the extremes of the oscillation cycle.

Figure 29:
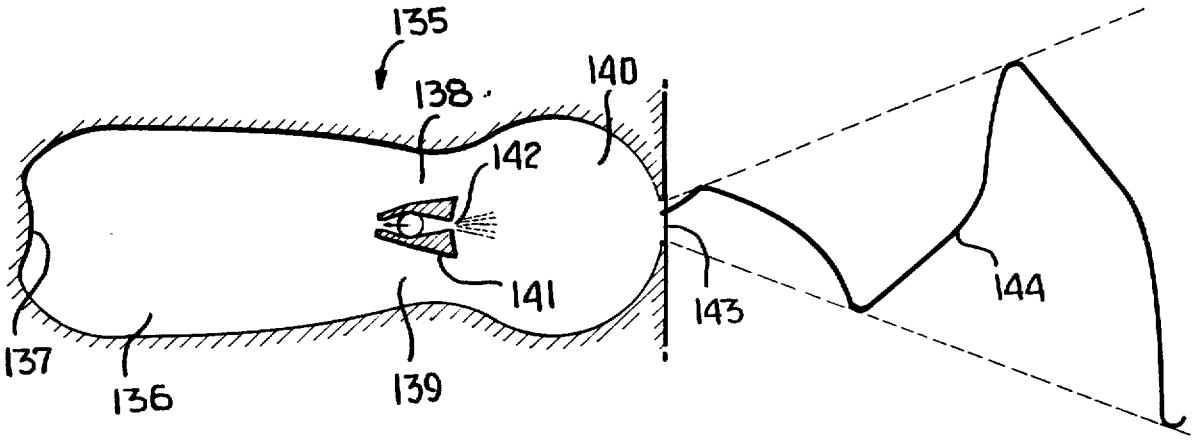
FIG. 29 is a diagrammatic illustration showing another embodiment of the oscillator/output chamber combination of the present invention and the waveform of the spray issued therefrom.

Referring to FIG. 29, there is illustrated another oscillator/output chamber combination 135. The oscillator portion of device 135 is characterized by an oscillation chamber 136 which is considerably longer than those described above and which includes a far wall 137 which is convex rather than concave. In addition, oscillator output passages 138 and 139 are somewhat wider than those illustrated in the embodiments described above. The output chamber 140 of device 135 is characterized by an opening 142 in U-shaped member 141 which issues fluid directly into the output chamber. Lengthening the oscillator chamber has the effect of reducing the frequency of oscillation since the vortices A and B of FIGS. 11–15 must travel greater distances during the oscillation cycle. I have found that such lengthening, beyond a certain point, requires a widening of outlet passages 138 and 139 in order to maintain uniform oscillation. Beyond a certain point (e.g. when the length of chamber 136 exceeds the outlet width of member 141 by twenty-five times) if the output passages are not widened there is a backloading in the chamber 136 which either produces sporadic oscillation or a stable condition. Longer oscillation chambers and their inherent lower frequencies are very suitable for massaging showers or decorative spray fountains and may be used with or without the convex wall 137 feature or the fill-in jet nozzle feature 142.

Convex wall 137 has the effect of causing the oscillation cycle to pass much more quickly between extreme positions than does a flat or concave wall. With a faster transition, the rise and fall times of the pulses delivered to output passages 138 and 139 are shortened. This feature may be used independently of the lengthened oscillation chamber and the fill-in jet.

The fill-in jet from opening 142 is used to increase the amount of fluid in the center of the issued spray pattern. In effect, this shortens the transition time between extreme sweep positions, causing greater "dwell" in the mid-portion of the sweep cycle than at the ends. This is reflected in the waveform 144 of the spray pattern issued from outlet 143 wherein it is noted that the transition region is bowed outward considerably. Relating this feature to the vector discussion and FIG. 16, fill-in flow from nozzle 142 imparts additional magnitude to the radial vector $V_R$, both in a dynamic sense (since the fill-in flow is directed along the radial vector direction) and as additional static pressure in output chamber 140.

The features described in relation to FIG. 29 provide additional techniques for shaping the output spray pattern and may be used with any of the other oscillators and output chambers described herein.

Figure 30:
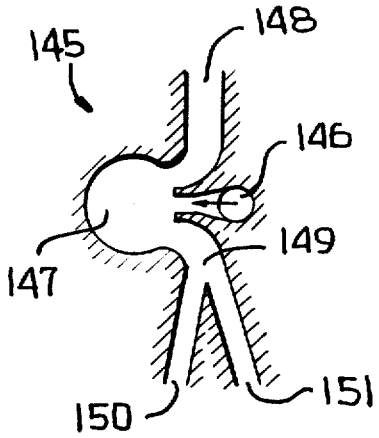
FIG. 30 is a diagrammatic top plan view of another oscillator embodiment of the present invention.

Oscillator 145 of FIG. 30 is illustrative of an embodiment wherein multiple outlets variously directed are achieved. Specifically a nozzle structure 146 issues a fluid jet into oscillation chamber 147 which may take any configuration consistent with the operating principles described in relation to FIGS. 11–15. Outlet passages 148 and 149 are shown as being turned outwardly, substantially at right angles to the input jet, rather than being directed in 180° relation to that jet. It is to be understood that these passages can be turned at any angle or in any direction, in or out of the plane of the drawing, depending upon the application. Further, one or more of these passages, for example passage 149, may be bifurcated to provide two passages 150 and 151 which conduct co-phasal output pulses. It is to be understood that any of passages 148, 149, 150, 151 may be lengthened or shortened to delay the issuance of output pulses therefrom to obtain a variety of different effects and results.

Figure 31:
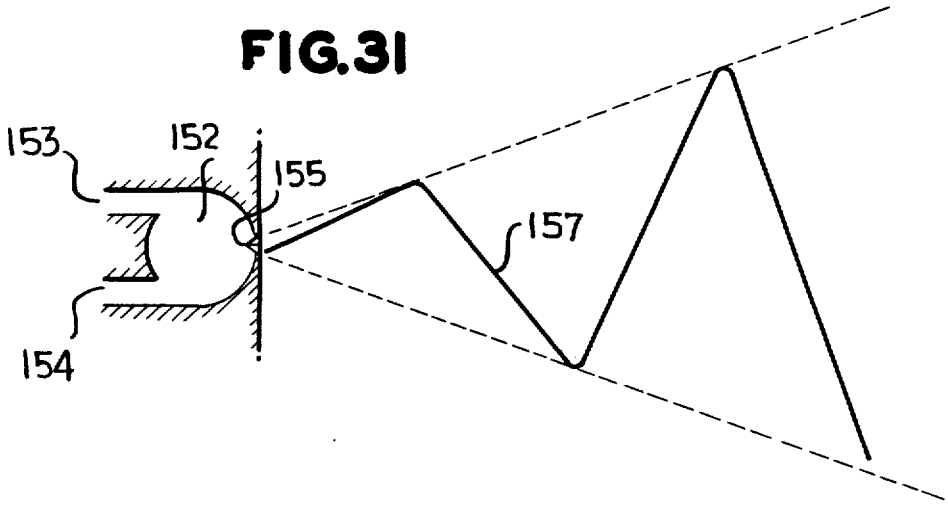
FIGS. 31 and 32 are diagrammatic top plan and side section views, respectively, of another output chamber according to the present invention, showing the spray pattern issued therefrom.
Figure 32:
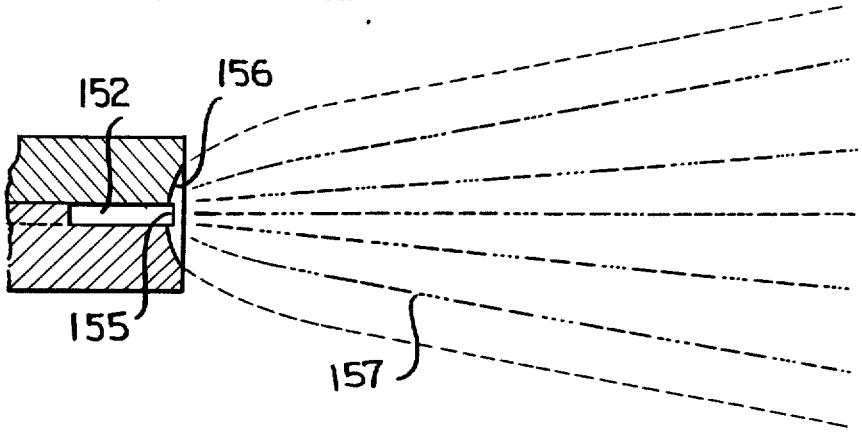

The fan-shaped spray patterns described as being issued by the output chambers described above provide a line or one-dimensional pattern when they impinge upon a target. In other words, when the cyclically swept spray impacts against a surface interposed in the spray pattern, the fluid sweeps back and forth along a line on that surface. It is also possible to achieve a two-dimensional spray pattern from the output chamber of the present invention. An output chamber embodiment for achieving spray coverage of a two-dimensional target area is illustrated in FIGS. 31 and 32. Specifically, an output chamber 152 is fed alternating fluid pulses from passages 153 and 154. The outlet opening 155 from chamber 152, instead of merely being a slot defined in the natural periphery of the chamber, is in the form of a notch cut into the chamber. In the embodiment shown the notch is cut along the central longitudinal axis of the device by a circular blade to provide an arcuate notch 156 perpendicular to the plane of chamber 152 and having a V-shaped cross-section. Cutting the outlet into the chamber allows the static pressure therein to expand in all directions. As a consequence, the spray issued from the outlet 155 follows the contours of notch 156 to provide a sheet of fluid in the plane of the notch (i.e. perpendicular to the plane of the chamber 152). This sheet is swept back and forth due to the alternating vortex action described in relation to FIG. 16 so that the spray pattern issued from outlet 155 forms a cyclically sweeping sheet. This sweeping sheet covers a rectangular area when it impinges on a target disposed in the spray path, thereby affording two-dimensional spray coverage. I have found that as the notch is cut deeper into chamber 152, the angle of the sheet expansion in the vertical plane increases. Various contouring of the notch cross-section permits contouring of the distribution of droplets in the vertical plane (i.e. perpendicular to the chamber).

Figure 33:
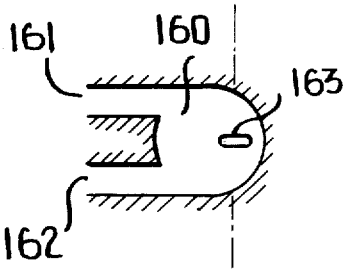
FIGS. 33 and 34 are diagrammatic top plan and end section views, respectively, of another output chamber embodiment according to the present invention, showing the waveform of the spray pattern issued therefrom.
Figure 34:
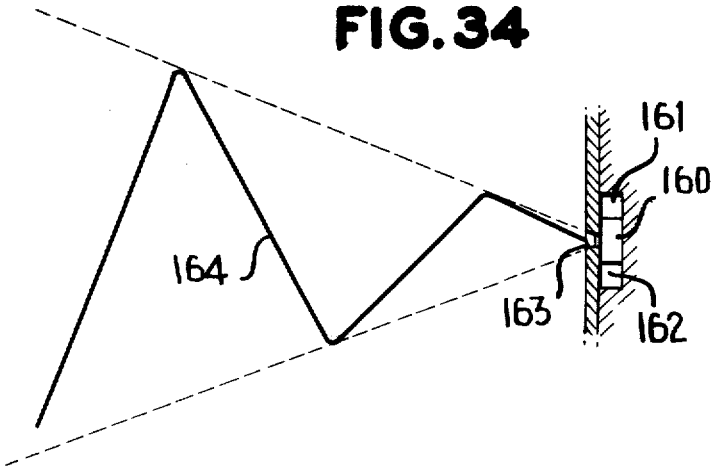

Another output chamber embodiment is illustrated in FIGS. 33 and 34. In this embodiment the output chamber 160 receives alternating fluid pulses from passages 161 and 162 and delivers a planar or fan shaped swept pattern from a slot shaped outlet opening 163. However, outlet opening 163 is formed in the floor (or ceiling) of the chamber rather than being defined in the end wall thereof. The same vectorial analysis applied to the chamber of FIG. 16 is applicable to chamber 160 but in chamber 160 it is noted that outlet opening 163 extends along the radius of the alternating vortex. Since the spin velocity of a vortex varies at different radial points, the tangential velocity vector $V_T$ varies along the length of opening 163. The result renders the issued spray pattern waveform somewhat asymmetric into the plane of the drawing in FIG. 34, the asymmetry being greater for longer outlet openings.

Figure 35:
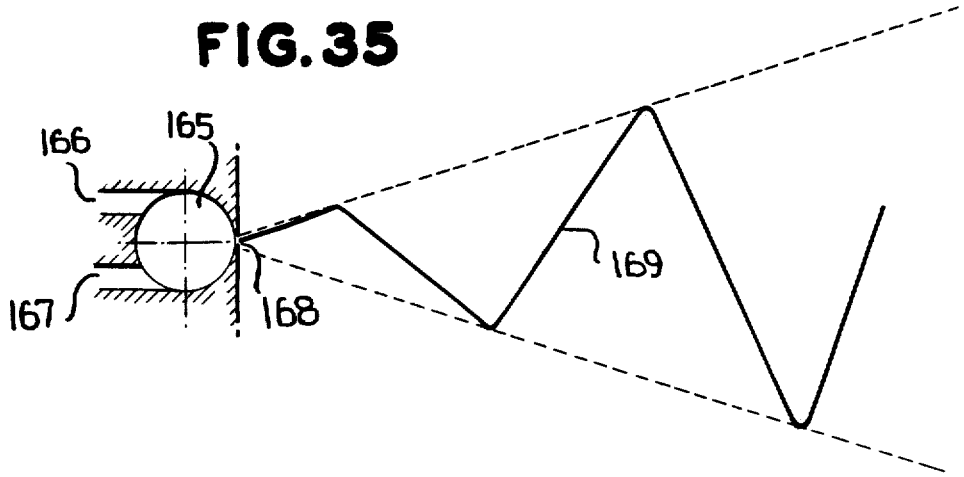
FIGS. 35 and 36 are diagrammatic top plan and side section views, respectively, of another output chamber embodiment of the present invention, showing the spray pattern issued therefrom.
Figure 36:
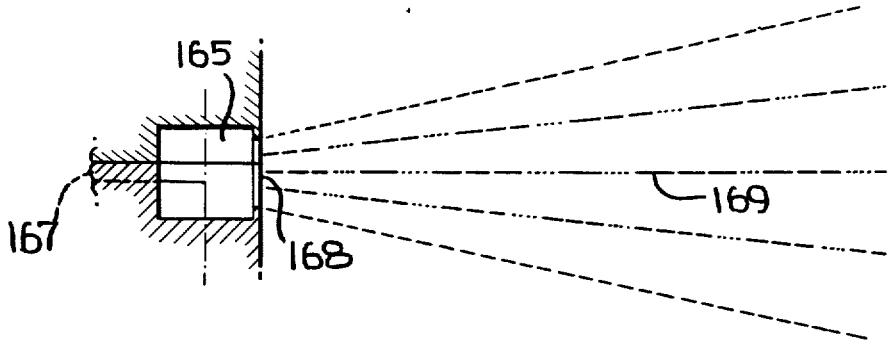

Still another output chamber configuration is illustrated in FIGS. 35 and 36. This embodiment, like that of FIGS. 31 and 32, provides a swept sheet pattern which covers a two-dimensional target area rather than a lineal target. The output chamber 165 receives alternating fluid pulses from passages 166 and 167, similar to chambers described above. However, chamber 165 is expanded cylindrically, perpendicular to the plane of passages 166, 167, so that the depth of chamber 165, as best seen in FIG. 36, is substantially greater than that of previously described chambers. Outlet slot 168 is defined in the periphery of the chamber and extends parallel to the cylindrical axis of the chamber. When pressurized fluid is issued from chamber 165 it is formed into a sheet 169 by slot 168, the sheet residing in a plane perpendicular to the plane of vortex spin in chamber 165. The alternating spin causes the issued sheet to oscillate back and forth according to the principles described in relation to FIG. 16. The resulting waveform provides an even distribution of droplets along the sheet height. Distribution along the sheet width (the dimension shown in FIG. 35) is determined by the various features and factors described herein relating to oscillator and output chamber configurations.

Figure 37:
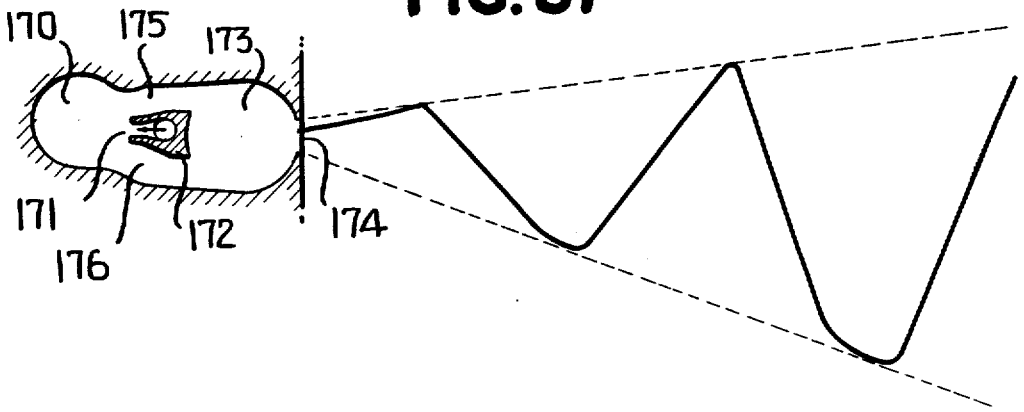
FIG. 37 is a diagrammatic plan view of an asymmetric oscillator/output chamber combination of the present invention.

The oscillator/output chamber configuration 170 in FIG. 37 is characterized by its asymmetry with respect to its longitudinal centerline. Oscillator chamber 170 receives a jet from nozzle 171 of member 172 in a direction which is not radial but nevertheless across the chamber. As a consequence, the oscillation, which ensues according to the principles described in relation to FIGS. 11–15, is unbalanced in that the fluid slugs issued into outlet passage 175 are of longer duration than the pulses issued into outlet passage 176. As a consequence, the clockwise spin in output chamber 173 has a longer duration than the counterclockwise spin and the spray pattern issued from outlet opening 174 is heavier on the bottom side (as viewed in FIG. 37) of the longitudinal centerline than the top side. Asymmetrical construction of the oscillator, output chamber, positioning of member 172, location of outlet 174, etc., may all be utilized to achieve desired spray patterns.

The output chamber 177 of FIGS. 38 and 39 has two characterizing features. First, the outlet opening 185 is a generally circular hole 185 defined through the ceiling or floor of the chamber, substantially at the chamber center. Second, flow dividers 178 and 179 are positioned to divide the incoming fluid pulses. Specifically, divider 178 divides an incoming pulse between passage 183 which extends around the chamber periphery and passage 184 which is disposed on the radially inward side of divider 178. Likewise, divider 179 divides an incoming pulse of the opposite sense between outer passage 180 and inner passage 181. The outlet opening 185, positioned as described, provides a hollow conical spray pattern 186 which alternately rotates in one direction and then the other as the output vortex in chamber 177 alternates spin directions. The speed angle of the conical pattern 186 varies with spin velocity so that as the output vortex speeds up and slows down during direction changes, the spray pattern 186 alternately opens (186) and closes (187). In this manner the pattern 186, when impinging upon a target, covers a generally circular area. The flow dividers 178 and 179 impart spin components to the output vortex at four locations instead of two, resulting in minimal movement of the output vortex in the chamber. The output vortex is thus maintained centered over outlet opening 185 to assure the symmetry of the spray conical pattern 186, 187. The features of FIGS. 38, 39 (namely, location of outlet 185 and presence of dividers 178, 179) can be used independently.

A similar spray pattern is achieved with the outlet chamber 190 of FIGS. 40, 41. Specifically, output chamber 190 is in the form of a cylinder which extends out of the plane of the incoming pulses from passages 192, 193 and then tapers in a funnel-like fashion toward a central output opening 191. Again the resulting output spray pattern is a spinning conical sheet which continuously changes spin direction as the output vortex direction changes in chamber 190 and which goes from an expanded wide-angle cone 194 at maximum spin to a relatively contracted cone 195 at minimum spin.

The device of FIGS. 38, 39, and that of FIGS. 40, 41 is useful for decorative fountains, showers, container spray nozzles, etc.

The apparatus of FIGS. 42 and 43 expands the principles of the outlet chamber of the present invention to three dimensional spin in the output vortex. Specifically, a generally spherical chamber receives a pair of alternating fluid signals or pulses from a first oscillator or other source 201 at diametrically opposed inlet openings 202 and 203. Another pair of diametrically opposed inlet ports 204, 205 receive alternating fluid signals or pulses from a source 206. The signals from source 201 have a frequency $f_1$; the signals from source 206 have a frequency $f_2$. The plane of ports 202, 203 is perpendicular to the plane of ports 204, 205, although this is by no means a limiting feature of the present invention. The outlet opening 207 for the spherical chamber 200 is located where the intersection of these two planes intersects the chamber periphery. Depending upon the relative frequency and phase of the signals from sources 201 and 206, a variety of output spray patterns can be obtained. Thus, if frequencies $f_1$ and $f_2$ are equal but are displaced in phase by 90°, a hollow spray pattern is issued which is of square cross-section if the input signals are well-defined pulses, of circular cross-section if the input signals are sinusoidal functions, etc. If frequency $f_1$ is twice that of $f_2$, and the input signals are sinusoidal, a figure eight pattern is generated. In other words, the cross-section of the pattern issued from outlet opening 207 takes the form of the well-known Lissajous patterns achieved on cathode ray oscilloscope displays. By choosing proper phase and frequency relationships between the input signals, an extremely large variety of waveshapes may be achieved.

Figure 44:
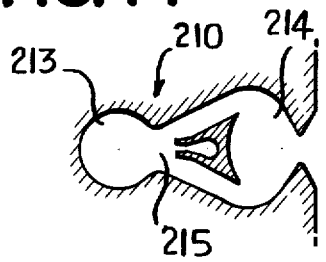
FIGS. 44, 45, 46 and 47 are diagrammatic top plan views of four additional oscillator/output chamber combinations according to the present invention.
Figure 45:
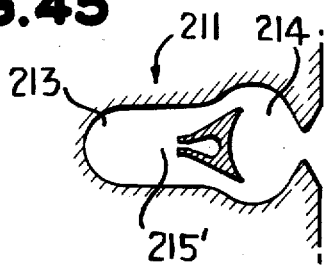
Figure 46:
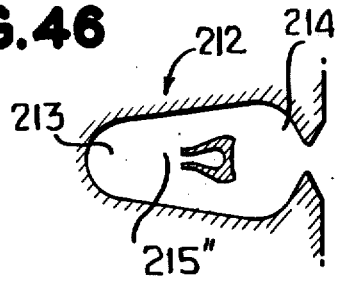

Referring to FIGS. 44, 45 and 46 there are three oscillator/output chamber combinations illustrated. In the three devices 210, 211 and 212, respectively, the sizes and shapes of the oscillator chamber 213 and output chamber 214 are substantially the same. The differences reside in the sizes of the common inlet and outlet openings 215, 215' and 215" of the three devices, the opening being smallest in device 210, largest in device 212. The waveforms of the spray patterns are affected as follows: For the smallest opening (device 210) the observed waveform was a well-defined sawtooth with slight rounding at the extremities. For the medium opening (device 211) the sawtooth waveform showed less rounding or curvature at the extremities as compared to that for device 210. For the largest opening 215" (device 212) even less rounding was observed, the waveform appearing almost triangular, substantially like waveform 91 of FIG. 20. The last mentioned waveform provides the most even droplet distribution of the three. In general it may be started that the wider the opening 215, the less the flow restriction at the oscillator output and the greater the filtering effect in the output chamber.

Figure 47:
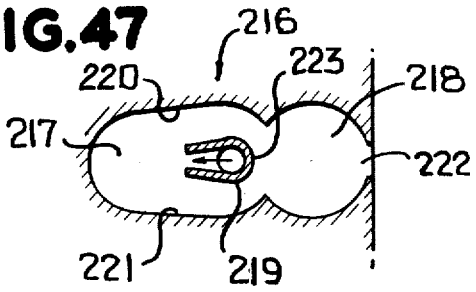

In FIG. 47 an oscillator/output chamber combination 216 includes an oscillation chamber 217 and an output chamber 218. This device is characterized by the fact that the side walls 220 and 221 converge just behind U-shaped jet-issuing member 219 to form a throat 223, and then diverge in the output chamber 218 and converge again to form an output opening 222. This configuration effects a flow reversal so that fluid which flows along sidewall 220 out of oscillation chamber 217 is turned at throat 223 to flow along the opposite wall as it enters the output chamber 218. Operation is the same as previously described for the non-reversing flow arrangement except that a greater spin effect is provided in chamber 218 by the wall curvature.

Figure 48:
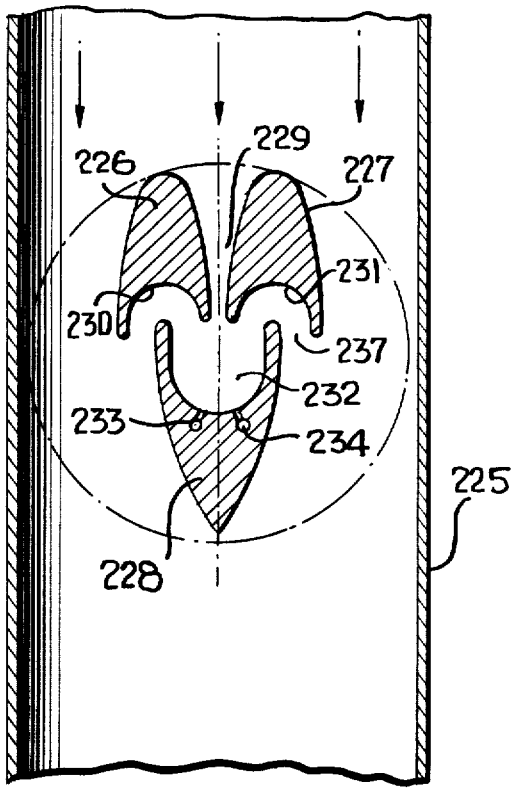
FIGS. 48 and 49 are top section and end views, respectively, of an oscillator of the present invention employed as a flow meter.
Figure 49:
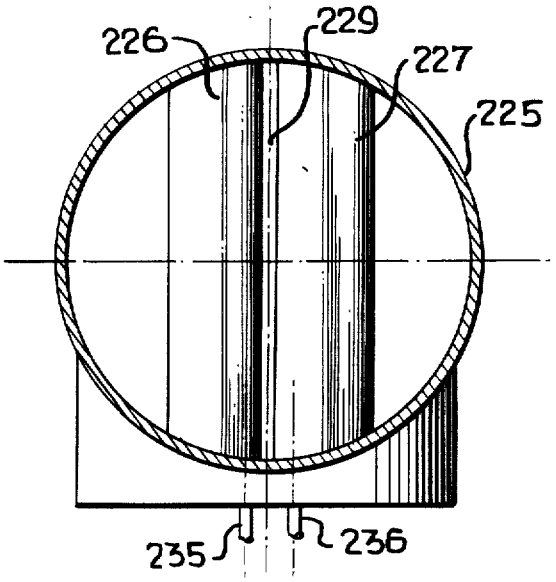

In FIGS. 48 and 49 there is illustrated an embodiment of the oscillator of the present invention which is employed as a flow meter. Specifically a flow channel 225 is illustrated as a cylindrical pipe. It is to be understood that the channel 225 can take any configuration, and may even be open along its top. Fluid flow in the flow channel 225 is represented by the arrows shown in FIG. 48. Two semi-oval members 226 and 227 are disposed with their major axes parallel to the flow direction and are slightly spaced apart to define a downstream tapering nozzle 229 therebetween. The downstream ends of members 226 and 227 are formed as downstream-facing cusps 230 and 231, respectively. A body member 228 has an oscillation chamber 232 defined therein, chamber 232 being shown as U-shaped in FIG. 48 but capable of assuming any configuration consistent with the operational characteristics described herein for oscillator chambers. The oscillation chamber 232 is shown disposed symmetrically with respect to nozzle 229, but this is not a requirement. A pair of tiny pressure ports 233 and 234 are defined in the downstream end of chamber 232; again, these ports are shown disposed symmetrically with respect to nozzle 229 but this is not a limiting feature of the invention. The pressure ports 233 and 234 communicate with tubes 235, 236 which extend out through channel 225.

In operation, a portion of the flow in channel 225 is directed into nozzle 229 which issues a jet into chamber 232. Oscillation ensues in chamber 232 in the manner described in relation to FIGS. 11–15. Alternating outflow pulses are first directed upstream when egressing from chamber 232 and are then redirected by cusps 230, 231 into the main channel flow. As the jet in chamber 232 is swept back and forth by the alternating vortices, the differential pressure at ports 233, 234 (and therefore at tubes 235, 236) varies at the frequency of oscillation. I have found that the frequency of oscillation for the oscillator of the present invention varies linearly with the flow therethrough. Consequently, by employing a conventional transducer, for example an electrical pressure transducer, it is possible to provide a measurement of flow through channel 225.

The flow metering arrangement of FIGS. 48, 49 is highly advantageous as compared to prior art attempts to employ fluid oscillations as a flow measurement parameter. For example, only a small oscillator need be used, thereby minimizing any losses introduced by the oscillator. Further, the channel flow which by-passes the oscillator (i.e. flow around the outside of members 226 and 227) serves to aspirate flow from the cusp regions 230, 231, thereby providing a differential pressure effect across the oscillator. Importantly, the negative aspiration pressure permits the by-pass flow to affect oscillator frequency and thereby permit more than just the limited flow through the nozzle 229 to be part of the measurement. Since flow velocity tends to vary somewhat across a channel, this use of a greater portion of the flow without increasing losses, is highly advantageous. It is to be understood that all of the flow can be directed through the oscillator, if desired, but that losses are minimized if only a small part of the flow is so directed.

The oscillation frequency can be sensed in many places. Pressure ports 233, 234 are particularly suitable because the dynamic pressure in the jet is available where these ports are shown, and that pressure is easily sensed. It is also possible to insert a hot wire anemometer or other flow transducing device 237 in one of the output passages of the oscillator to sense flow frequency.

The oscillator and output chamber of the present invention have been described as having certain advantages. Included among these is the fact that the oscillator oscillates without a cover plate (i.e. without plate 12 of FIG. 1) at low pressures. This is highly advantageous for many applications, including flow measurement in open channels or rivers.

The oscillator also operates with substantially all fluids in a variety of fluid embodiments, such as with gas or liquid in a gaseous environment, gas or liquid in a liquid environment, fluidized suspended solids in a gas or liquid environment, etc. Importantly, oscillation begins at extremely low applied fluid pressures, on the order of tenths of a psi, for many applications. Moreover, oscillation begins immediately; this is, there is no non-oscillating "warm-up" period because there can be no outflow until oscillation ensues. The oscillator and output chamber can be symmetric or not, can have a variable depth, can be configured in a multitude of shapes, all of which can be employed by the designer to achieve the desired spray pattern.

The output chamber although shown herein to have smooth curved peripheries, can have any configuration in which a vortex will form. Thus, sharp corners in the output chamber periphery, while affecting the waveshape, will still permit operation to ensue as described in relation to FIG. 16. Further, the number of outlets from the output chamber, while affecting the waveshape, does not preclude vortex formation. Specifically, I have found that as the total outlet area is increased the sweep angle $\alpha$ increases. In particular, in a chamber similar to chamber 61 of FIG. 17, I have found that by blocking off one of the outlet openings, the spray pattern issued from the other outlet opening reduced considerably, with the shape of the wave remaining about the same. Likewise, in chamber 37 of FIG. 16, if the single outlet 38 is reduced in size, the angle of the sweep is reduced. These sweep angle changes are produced because the static pressure in the chamber is increased when the outlet is reduced and therefore the radial vector $V_R$ begins to dominate.

While I have described and illustrated various specific embodiments of my invention, it will be clear that variations of the details of construction which are specifically illustrated may be resorted to without departing from the true spirit and scope of the invention as defined in the appended claims.

I claim:

[1. A fluid oscillator comprising:

nozzle means for forming and issuing a jet of fluid in response to application thereto of fluid under pressure;

an oscillation chamber having a common inlet and outlet opening, said oscillation chamber being positioned to receive said jet of fluid from said nozzle means through said common opening, said oscillation chamber including:

oscillation means for cyclically oscillating said jet back and forth across said chamber in a direction substantially transverse to the direction of flow in said jet; and flow directing means for directing fluid from the cyclically oscillated jet out of said chamber through said common inlet and outlet opening.]

[2. The oscillator according to claim 1 wherein said oscillation means comprises impingement means, disposed in said oscillation chamber in the path of said jet, for forming, on each side of said jet, vortices of said jet fluid which alternate in both strength and chamber position in phase opposition.]

[3. The oscillator according to claim 2 wherein said impingement means comprises a far wall of said chamber remote from said common inlet and outlet opening.]

[4. The oscillator according to claim 3 wherein said flow directing means comprises said far wall and opposing sidewalls of said chamber.]

[5. The oscillator according to claim 4 wherein said nozzle means is positioned to issue said jet generally radially across said oscillaion chamber toward said far wall, and wherein said common inlet and outlet opening is defined as a space between said opposed sidewalls.]

[6. The oscillator according to claim 4 further comprising:

a first outlet passage positioned at one side of said nozzle means to receive fluid flowing out of said common inlet and outlet opening along said one side of said jet; and a second outlet passage positioned at the opposite side of said nozzle means to receive fluid flowing out of said common inlet and outlet opening along said opposite side of said jet.]

[7. The oscillator according to claim 6 wherein at least one of said outlet passages is bifurcated.]

8. [The oscillator according to claim 6 further comprising:] *A fluid oscillator comprising:*

*nozzle means for forming and issuing a jet of fluid in response to application thereto of fluid under pressure;*

*an oscillation chamber having a substantially central region and a common inlet and outlet opening, said oscillation chamber being positioned to receive said jet of fluid from said nozzle means through said common opening, said oscillation chamber including:*

*oscillation means for cyclically deflecting said jet from side to side in said chamber in a direction substantially transverse to the direction of flow in said jet;*

*said oscillation means including impingement means disposed in said oscillation chamber in the path of said jet for forming two vortices of said jet of fluid which remain in said oscillation chamber during oscillation, one vortex on each side of said jet, said impingement means comprising:*

*means for alternating the strengths of said vortices in phase opposition, and for moving said vortices, in phase opposition, between positions proximate said common opening and said central region; and*

*a far wall of said chamber remote from said common inlet and outlet opening and devoid of discontinuities which project into said chamber;*

*flow directing means including said far wall and opposing side walls of said chamber for directing fluid from the cyclically oscillated jet out of said chamber through said common inlet and outlet opening along both sides of said jet such that less flow always egresses along the side toward which said jet is deflected than along the opposite side; and wherein said common inlet and outlet opening is defined as a space between said opposed sidewalls;*

*said nozzle means being positioned to issue said jet generally radially across said oscillation chamber toward said far wall;*

*a first outlet passage positioned at one side of said nozzle means to receive fluid flowing out of said common inlet and outlet opening along said one side of said jet;*

*a second outlet passage positioned at the opposite side of said nozzle means to receive fluid flowing out of said*

*common inlet and outlet opening along said opposite side of said jet;* an output chamber;

means connecting said first outlet passage to said output chamber for delivering fluid from said first outlet passage into said output chamber in a first vortical flow direction;

means connecting said second outlet passage to said output chamber for delivering fluid from said second outlet passage into said output chamber in a second vortical flow direction;

whereby in said output chamber an output vortex is established which alternately spins in one direction in response to inflow from said first outlet passage and in the opposite direction in response to inflow from said second outlet passage; and outlet opening means defined in said output chamber and communicating with ambient environment for issuing from said output chamber a cylically sweeping flow pattern.

9. The oscillator according to claim 8 wherein said output chamber is formed between a pair of converging walls which terminate in spaced relation to define said outlet opening means.

10. The oscillator according to claim 8 wherein said outlet opening means includes a plurality of individual openings from said output chamber.

11. The oscillator according to claim 8 wherein said output chamber is defined in part by a ceiling, a floor and a continuous wall extending between said outlet passages and wherein said outlet opening means comprises at least one opening defined in one of said ceiling and floor.

12. The oscillator according to claim 8 wherein said nozzle means comprises a member disposed between said oscillation chamber and said output chamber, said member including a nozzle for issuing said jet at its upstream end and a further wall constituting part of said output chamber periphery at its downstream end.

13. The oscillator according to claim 12 wherein said further wall is concave.

14. The oscillator according to claim 12 wherein said further wall is substantially straight.

15. The oscillator according to claim 12 wherein said further wall is convex.

16. The oscillator according to claim 12 further comprising additional nozzle means in said member for issuing said applied fluid under pressure directly into said output chamber.

17. The oscillator according to claim 12 wherein said output chamber is substantially rectangular.

18. The oscillator according to claim 12 wherein said oscillation chamber includes first and second sidewalls which extend from said far wall in said oscillation chamber to beyond said member to constitute first and second sidewalls, respectively, of said output chamber.

19. The oscillator according to claim 18 wherein said first and second outlet passages are defined between said member and the portions of said first and second sidewalls, respectively, which extend between said oscillation and output chambers.

20. The oscillator according to claim 19 wherein said first and second sidewalls converge throughout the length of said output chamber towards said outlet opening means.

21. The oscillator according to claim 19 wherein said first and second sidewalls in said output chamber first diverge and then converge in a downstream direction.

22. The oscillator according to claim 19 wherein said first and second sidewalls are substantially parallel throughout the length of said output chamber.

23. The oscillator according to claim 19 wherein said first and second sidewalls in said output chamber converge toward the downstream end of said chamber, and wherein said outlet opening means comprises at least one outlet opening defined between the converging first and second sidewalls.

24. The oscillator according to claim 23 wherein said output chamber is further enclosed between top and bottom walls extending generally perpendicular to said first and second sidewalls.

25. The oscillator according to claim 24 wherein the depth dimension of said output chamber between said top and bottom walls is greater than the depth of said first and second outlet passages.

26. The oscillator according to claim 25 wherein said outlet opening means comprises a slot defined through periphery of said output chamber, said slot being longer in its dimension parallel to the depth of said output chamber than in its width dimension extending between said first and second sidewalls.

27. The oscillator according to claim 25 wherein said outlet opening means comprises an outlet opening defined in at least one of said ceiling and floor.

28. The oscillator according to claim 27 wherein said outlet opening is defined substantially centrally in said output chamber.

29. The oscillator according to claim 28 wherein said output chamber tapers in its depth dimension toward outlet opening.

30. The oscillator according to claim 27 wherein said outlet opening is a slot disposed off-center in said output chamber.

31. The oscillator according to claim 24 wherein said outlet opening means includes a notch cut into the output chamber entirely through said top and bottom walls.

32. The oscillator according to claim 19 wherein said first and second sidewalls in said output chamber first diverge and then converge toward said outlet opening means, and wherein said first and second sidewall slightly upstream of said output chamber converge to define an entry throat to said output chamber.

33. The oscillator according to claim 8 further comprising means for expanding the fluid flow pattern issuing from said outlet opening means in a direction normal to the sweep direction in said cyclically sweeping flow pattern.

34. The oscillator according to claim 8 further comprising means in said output chamber for issuing said cyclically sweeping flow pattern in a generally fan-shaped spray subsisting substantially in a common plane with said output vortex.

35. The oscillator according to claim 8 further comprising means for issuing said cyclically sweeping flow pattern as a cyclically swept fluid sheet extending significantly out of the plane of the output vortex.

[36. The oscillator according to claim 5 wherein said oscillation chamber is generally circular, said common inlet and outlet opening subtending an arc on the oscillation chamber periphery.]

[37. The oscillator according to claim 36 wherein said arc is greater than 180°.]

[38. The oscillator according to claim 26 wherein said arc is less than 180°.]

[39. The oscillator according to claim 36 wherein said arc is substantially equal to 180°.]

[40. The oscillator according to claim 5 wherein said oscillator chamber is generally rectangular.]

[41. The oscillator according to claim 5 wherein said far wall in said oscillation chamber is substantially flat.]

[42. The oscillator according to claim 41 wherein the sidewalls of said oscillator chamber diverge from said far wall toward said common inlet and outlet opening.]

[43. The oscillator according to claim 5 wherein said far wall is concave.]

[44. The oscillator according to claim 5 wherein said far wall is convex.]

[45. The oscillator according to claim 5 further comprising first and second members disposed proximate said common inlet and outlet opening and spaced from said nozzle means, each member being disposed on a negative side of the jet issued from said nozzle means.]

[46. The oscillator according to claim 6 disposed in a flowing fluid to measure the flow thereof, said flowing fluid corresponding to the fluid under pressure applied to said nozzle means, said oscillator further comprising means for monitoring cyclic variations of a flow parameter in said chamber.]

[47. The oscillator according to claim 46 wherein said sensing means comprises a pair of pressure ports defined in said far wall, said pressure ports being symmetrically positioned with respect to said nozzle means.]

[48. The oscillator according to claim 46 wherein said sensing means comprises means for measuring cyclic flow variation in at least one of said outlet passages.]

[49. The oscillator according to claim 46 wherein said first and second outlet passages are curved to issue fluid in the same flow direction as said flowing fluid.]

[50. The oscillator according to claim 46 wherein said nozzle means has an inlet end which is streamlined and positioned to face directly upstream in said flowing fluid, and wherein said outlet passages are positioned to be aspirated by said flowing fluid.]

51. A spray-forming device comprising:

means for providing first and second fluid repetitive flows of varying amplitudes and different phases;

a chamber having peripheral walls;

means for directing said first and second fluid flows in opposite generally tangential directions into said chamber along said peripheral walls;

means for converting the fluid from said first and second fluid flows into an output vortex which fills said chamber and which alternately spins in first and second opposite directions about a spin axis in response to inflowing of said first and second fluid flows to said chamber; and outlet means displaced from said spin axis for providing an outflow flow from said chamber to ambient environment, which output flow is cyclically swept back and forth as said vortex spins in said first and second directions, respectively.

52. The device according to claim 51 wherein said outlet means includes an opening in the periphery of said chamber which communicates between the chamber interior and ambient environment.

53. The device according to claim 51 wherein said outlet means comprises means for issuing fluid from said chamber at a velocity which is the vectorial sum of a first vector directed tangentially to said output vortex at said outlet means and a second vector directed radially outward from said output vortex, said first vector being determined by the spin velocity of said vortex at said outlet means, said second vector being determined by the static pressure at said outlet means.

54. The device according to claim 53 wherein said outlet means comprises an opening in the periphery of said chamber which communicates between the chamber interior and ambient environment.

55. The device according to claim 54 wherein said chamber has top and bottom walls and sidewalls, said output vortex being constrained to flow in a plane which is substantially parallel to at least one of said top and bottom walls.

56. The device according to claim 55 wherein said outlet means comprises an opening in one of said top and bottom walls.

57. A spray-forming device comprising:

means for providing first and second fluid repetitive flows of varying amplitudes and different phases;

a chamber having peripheral walls;

means for directing said first and second fluid flows in opposite generally tangential directions into said chamber along said peripheral walls;

means for converting the fluid from the inflowing fluid flows into an output vortex which fills said chamber and which alternately spins in first and second opposite directions in response to inflowing of said first and second fluid flows to said chamber; and outlet means for providing an output flow from said chamber to ambient environment, which output flow is cyclically swept back and forth as said vortex spins in said first and second directions, respectively, said outlet means comprising means for forming said output flow into a sheet of fluid expanding normal to the direction in which said output flow is cyclically swept.

58. A spray-forming device comprising:

means for providing first and second fluid repetitive flows of varying amplitudes and different phases;

a chamber having peripheral walls;

means for directing said first and second fluid flows in opposite generally tangential directions into said chamber along said peripheral walls;

means for converting the fluid from the inflowing fluid flows into an output vortex which fills said chamber and which alternately spins in first and second opposite direction in response to inflowing of said first and second fluid flows to said chamber; and outlet means for providing an output flow from said chamber to ambient environment, which output flow is cyclically swept back and forth as said vortex spins in said first and second directions, respectively, said chamber being between first and second sidewalls which converge toward said outlet means.

59. A spray-forming device comprising:

means for providing first and second fluid repetitive flows of varying amplitudes and different phases;

a chamber having peripheral walls;

means for directing said first and second fluid flows in opposite generally tangential directions into said chamber along said peripheral walls;

means for converting the fluid from the inflowing fluid flows into an output vortex which fills said chamber and which alternately spins in first and second opposite directions in response to inflowing of said first and second fluid flows to said chamber; and outlet means for providing an output flow from said chamber to ambient environment, which output flow is cylically swept back and forth as said vortex spins in said first and second directions, respectively, said first and second fluid repetitive flows comprising first and second pulse trains, the device further comprising first and second flow dividers positioned in the paths of said first and second pulse trains, respectively, to divide the fluid pulses into two separate pairs, said flow dividers each having curved walls shaped to direct the divided pulse flows rotationally in said chamber.

60. A spray-forming device comprising:

means for providing first and second fluid repetitive flows of varying amplitudes and different phases;

a chamber having peripheral walls;

means for directing said first and second fluid flows in opposite generally tangential directions in said chamber along said peripheral walls;

means for converting the fluid from the inflowing fluid flows into an output vortex which fills said chamber and which alternately spins in first and second opposite directions in response to inflowing of said first and second fluid flows in said chamber; and outlet means for providing an output flow from said chamber to ambient environment, which output flow is cyclically swept back and forth as said vortex spins in said first and second directions, respectively;

said chamber being semi-spherical and said means for directing first and second fluid flows comprising first and second substantially co-planar flow passages arranged to issue said first and second fluid flows in opposite tangential directions into said chamber, and wherein said outlet means includes an opening from said chamber to ambient residing in the plane of said first and second flow passages.

61. The device according to claim 60 further comprising third and fourth co-planar flow passages residing in a second plane other than that of said first and second flow passages and including said opening therein and arranged to issue respective third and fourth fluid fluid flows in opposite tangential directions into said chamber.

62. The device according to claim 61 wherein said second plane is perpendicular to the plane of said first and second flow passages.

63. The device according to claim 62 wherein said first and second fluid flows comprise first and second pulse trains equal in frequency and displaced in phase by 180° and said third and fourth fluid flows comprise third and fourth pulse trains equal in frequency and displaced in phase by 180°.

64. The device according to claim 63 wherein the frequencies of said first and third pulse trains are equal but displaced in phase by 90°.

65. The device according to claim 63 wherein the frequencies of said first and second pulse trains are twice the frequency of said third and fourth pulse trains.

66. The method of providing an oscillating fluid flow comprising the steps of:

issuing a fluid jet into a chamber through a common opening to impinge upon a wall of said chamber;

dividing the impinging jet into two oppositely recirculating vortical flow patterns *which remain in said chamber*, one on each side of said jet, which *patterns* increase and decrease in size in phase opposition;

*alternately moving said vortical flow patterns in phase opposition between locations proximate said common opening and remote from said common opening;* and [alternately] flowing fluid from said two vortical flow patterns out of said chamber *in phase opposition* through said common opening *such that more fluid egresses from the vortical flow pattern remote from said common opening than from the vortical flow pattern proximate said common opening.*

67. A device for spraying liquid comprising:

a body member;

an inlet for receiving pressurized liquid into said body member;

first and second outlet openings for issuing pressurized liquid from said body member in predetermined general directions into ambient environment; and sweeping means inside said body member for sweeping the liquid issued from said outlet openings back and forth transversely of said predetermined general directions to provide two simultaneous swept spray patterns.

68. The device according to claim 67 wherein said means comprises:

means for providing first and second repetitive fluid signal of varying amplitudes and different phases;

a chamber;

means for directing said first and second fluid signals into said chamber in opposite generally tangential directions; and means forming a vortex in said chamber from the fluid supplied from said first and second fluid signals, said vortex alternately spinning clockwise and counter-clockwise in response to said first and second fluid signals, respectively;

wherein said first and second outlet openings are located at the periphery of said chamber and at the and issue pressurized liquid from said vortex outer edge of said vortex in a direction determined by the rotational speed and direction of said vortex.

69. A spray device comprising:

a body member having a chamber region therein, an inlet opening for conducting pressurized liquid into said chamber region, and at least first and second outlet openings for issuing pressurized liquid from said chamber region to ambient environment;

fluid oscillator means in said chamber region for providing alternating oppositely-directed fluid vortices in response to conduction of said pressurized liquid into said chamber region; and means responsive to said alternating fluid vortices for causing fluid to issue in cyclically swept patterns from each of said first and second outlet openings.

70. The method of oscillating a fluid jet comprising the steps of:

issuing said jet into a chamber having a common inlet and outlet opening;

forming alternating oppositely-directed fluid vortices in said chamber from the fluid in said jet; [and,]

*retaining said vortices in said chamber while translating said vortices in phase opposition between locations proximate and remote from said common opening; and* under the influence of said alternating vortices, alternately directing fluid to opposite sides of said jet,

*around respective vortices,* and out of said chamber through said common inlet and outlet opening *such that less flow is directed out of said chamber from around the vortex proximate said common opening than from around the vortex remote from said common opening.*

71. The method according to claim 70 wherein the step of forming comprises the steps of:

impinging the issued jet against a peripheral wall of said chamber; and alternately directing fluid from the impinging jet in opposite tangential directions along said peripheral wall.

72. A spray-forming device comprising:

fluid oscillator means for receiving a flowing fluid and separating it into first and second fluid signals of varying amplitude and different phases;

a chamber including means for receiving said first and second fluid signals of varying amplitudes and different phases;

means for converting said fluid signals into a single body of vortically spinning fluid which fills said chamber and alternately spins in first and second directions in response to inflowing of said first and second signals to said chamber; and outlet means for providing an output spray from said chamber to ambient environment, said spray being swept back and forth as said vortically spinning fluid spins in said first and second directions, respectively.

73. A spray-forming device comprising:

means for providing first and second fluid repetitive flows of varying amplitudes and different phases;

a chamber having peripheral walls;

means for directing said first and second fluid flows in opposite generally tangential directions into said chamber along said peripheral walls;

means for converting the fluid from the inflowing fluid flows into an output vortex which fills said chamber and which alternately spins in first and second opposite directions in response to inflowing of said first and second fluid flows to said chamber; and outlet means for providing an output flow from said chamber to ambient environment, which output flow is cyclically swept back and forth as said vortex spins in said first and second directions, respectively;

said chamber having top and bottom walls and sidewalls, said output vortex being constrained to flow in a plane which is substantially parallel to at least one of said top and bottom walls;

said outlet means comprising an opening in said sidewalls which communicates between the chamber interior and ambient environment for issuing fluid from said chamber at a velocity which is the vectorial sum of a first vector directed tangentially to said output vortex at said outlet means and a second vector directed radially outward from said output vortex, said first vector being determined by the spin velocity of said vortex at said outlet means, said second vector being determined by the static pressure at said outlet means.

74. The device according to claim 73 wherein said opening is a slot having a length perpendicular to the plane of said output vortex which is greater than its width in the plane of said output vortex.

75. The device according to claim 73 wherein said opening is a slot having a length in the plane of said output vortex which is greater than its width perpendicular to the plane of said output vortex.

76. A spray-forming device comprising:

means for providing first and second fluid repetitive flows of varying amplitudes and different phases;

a chamber having peripheral walls;

means for directing said first and second fluid flows in opposite generally tangential directions into said chamber along said peripheral walls;

means for converting the fluid from the inflowing fluid flows into an output vortex which fills said chamber and which alternately spins in first and second opposite directions in response to inflowing of said first and second fluid flows to said chamber; and outlet means for providing an output flow from said chamber to ambient environment, which output flow is cyclically swept back and forth as said vortex spins in said first and second directions, respectively;

said chamber having top and bottom walls and sidewalls, said output vortex being constrained to flow in a plane which is substantially parallel to at least one of said top and bottom walls;

said outlet means comprising a plurality of openings in said sidewalls which communicate between the chamber interior and ambient environment for issuing fluid from said chamber at a velocity which is the vectorial sum of a first vector directed tangentially to said output vortex at said outlet means and a second vector directed radially outward from said output vortex, said first vector being determined by the spin velocity of said vortex at said outlet means, said second vector being determined by the static pressure at said outlet means.

77. A spray-forming device comprising:

means for providing first and second fluid repetitive flows of varying amplitudes and different phases;

a chamber having peripheral walls;

means for directing said first and second fluid flows in opposite generally tangential directions into said chamber along said peripheral walls;

means for converting the fluid from the inflowing fluid flows into an output vortex which fills said chamber and which alternately spins in first and second opposite directions in response to inflowing of said first and second fluid flows to said chamber; and, outlet means for providing an output flow from said chamber, to ambient environment, which output flow is cyclically swept back and forth as said vortex spins in said first and second directions, respectively;

said chamber having top and bottom walls and sidewalls, said output vortex being constrained to flow in a plane which is substantially parallel to at least one of said top and bottom walls;

said outlet means comprising an opening in the periphery of said chamber which communicates between the chamber interior and ambient environment for issuing fluid from said chamber at a velocity which is the vectorial sum of a first vector directed tangentially to said output vortex at said outlet means and a second vector directed radially outward from said output vortex, said first vector being determined by the spin velocity of said vortex at said outlet means, said second vector being determined by the static pressure at said outlet means; and, said opening comprising a notch defined through said top and bottom walls and said sidewalls.

78. A spray-forming device comprising:

means for providing first and second fluid repetitive flows of varying amplitudes and different phases;

a chamber having peripheral walls;

means for directing said first and second fluid flows in opposite generally tangential directions into said chamber along said peripheral walls;

means for converting the fluid from the inflowing fluid flows into an output vortex which fills said chamber and which alternately spins in first and second opposite directions in response to inflowing of said first and second fluid flows to said chamber; and, outlet means for providing an output flow from said chamber to ambient environment, which output flow is cyclically swept back and forth as said vortex spins in said first and second directions, respectively;

said chamber having top and bottom walls and sidewalls, said output vortex being constrained to flow in a plane which is substantially parallel to at least one of said top and bottom walls;

said outlet means comprising an opening in the periphery of said chamber which communicates between the chamber interior and ambient environment for issuing fluid from said chamber at a velocity which is the vectorial sum of a first vector directed tangentially to said output vortex at said outlet means and a second vector directed radially outward from said output vortex, said first vector being determined by the spin velocity of said vortex at said outlet means, said second vector being determined by the static pressure at said outlet means; and, said outlet means issuing said output flow in the form of a cyclically swept sheet of fluid extending in width perpendicular to the plane of said output vortex.

79. A spray-forming device comprising:

means for providing first and second fluid repetitive flows of varying amplitudes and different phases;

a semi-spherical chamber having peripheral walls;

means for directing said first and second fluid flows in opposite generally tangential directions into said chamber along said peripheral walls;

means for converting the fluid from the inflowing fluid flows into an output vortex which fills said chamber and which alternately spins in first and second opposite directions in response to inflowing of said first and second fluid flows to said chamber; and outlet means for providing an output flow from said chamber to ambient environment, which output flow is cyclically swept back and forth as said vortex spins in said first and second directions, respectively.

80. A spray-forming device comprising:

means for providing first and second fluid repetitive flows of varying amplitudes and different phases from a single incoming flow of substantially constant amplitude;

a chamber having peripheral walls;

means for directing said first and second fluid flows in opposite generally tangential directions into said chamber along said peripheral walls;

means for converting the fluid from said first and second fluid flows into a single output vortex which fills said chamber and which alternately spins in first and second opposite directions in response to inflowing of said first and second fluid flows to said chamber; and outlet means for providing an output flow from said chamber to ambient environment, which output flow is cyclically swept back and forth as said vortex spins in said first and second directions, respectively.

81. A spray-forming device comprising:

means for providing first and second fluid repetitive flows of varying amplitudes and different phases;

a chamber having peripheral walls;

means for directing said first and second fluid flows in opposite generally tangential directions into said chamber along said peripheral walls;

means for converting the fluid from the inflowing fluid flows into an output vortex which fills said chamber and which alternately spins in first and second opposite directions in response to inflowing of said first and second fluid flows to said chamber; and outlet means for providing an output flow from said chamber to ambient environment, which output flow is cyclically swept back and forth as said vortex spins in said first and second directions, respectively;

said chamber having top and bottom walls and sidewalls, said output vortex being constrained to flow in a plane which is substantially parallel to at least one of said top and bottom walls; and, said outlet means comprising an elongated slot extending radially in one of said top and bottom walls.

*82. The method according to claim 66 wherein said step of alternately flowing includes the step of directing the fluid flowing out of said chamber sufficiently close to said jet in said common opening to produce mutual aspiration without momentum interchange between the jet and the flowing fluid.*

*83. The method according to claim 70 wherein the step of alternately directing fluid includes the step of directing that fluid sufficiently close to the jet in said common opening to produce mutual aspiration without momentum interchange between the jet and the directed fluid.*

* * * * *